United States Patent [19]
Pon

[11] Patent Number: 6,031,884
[45] Date of Patent: Feb. 29, 2000

[54] CARRIER MULTIPATH ESTIMATION FOR WEIGHTED OR MODIFIED TRACKING USING WEIGHTED OR MODIFIED CORRELATIONS

[75] Inventor: Rayman W. Pon, Cupertino, Calif.

[73] Assignee: Trimble Navigation Limited, Sunnyvale, Calif.

[21] Appl. No.: 08/870,917

[22] Filed: Jun. 6, 1997

[51] Int. Cl.[7] .............................. H03D 1/04; G01S 13/00; H04B 1/10
[52] U.S. Cl. .............................. 375/346; 342/65; 455/295
[58] Field of Search ..................................... 375/346, 200, 375/206, 208, 209, 210, 343; 342/65, 357, 463, 450, 417; 455/295, 296, 303, 506

[56] References Cited

U.S. PATENT DOCUMENTS

| | | | |
|---|---|---|---|
| 5,347,536 | 9/1994 | Meehan .................................. | 375/200 |
| 5,414,729 | 5/1995 | Fenton .................................. | 375/209 |
| 5,729,571 | 3/1998 | Park et al. .............................. | 375/206 |
| 5,809,064 | 9/1998 | Fenton et al. .......................... | 275/208 |
| 5,901,183 | 5/1999 | Garin et al. ............................ | 375/343 |

*Primary Examiner*—Chi H. Pham
*Assistant Examiner*—Khai Tran
*Attorney, Agent, or Firm*—Boris G. Tankhilevich

[57] ABSTRACT

The apparatus and method for estimation and minimization of the carrier multipath response envelope are disclosed. The reduction of the carrier multipath error signal is achieved by using the weighted or modified tracking or estimation circuits. The Modify and Weight signals are generated by the generator of Modify or Weight signals at five different circuit levels.

25 Claims, 18 Drawing Sheets

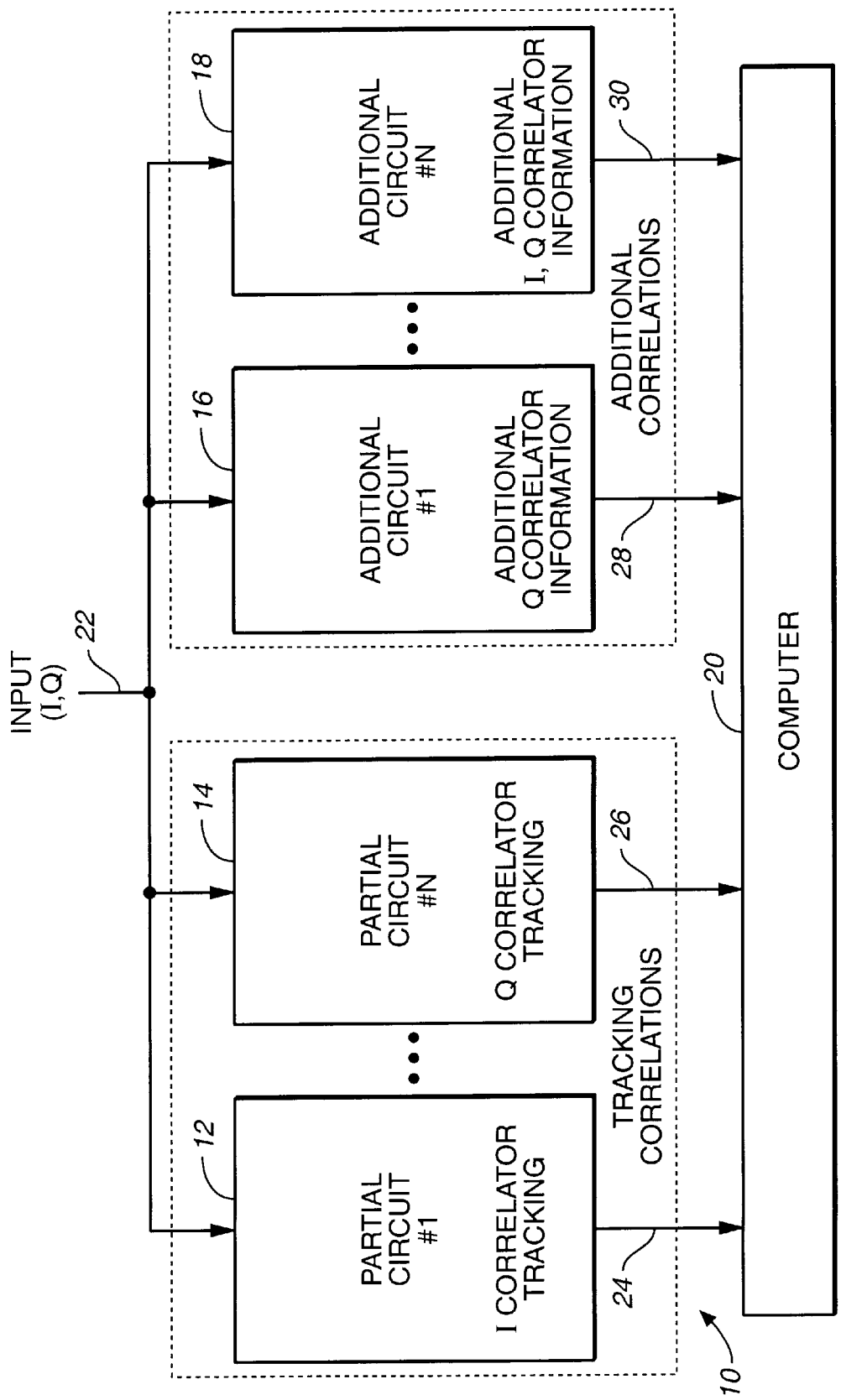
FIG._1

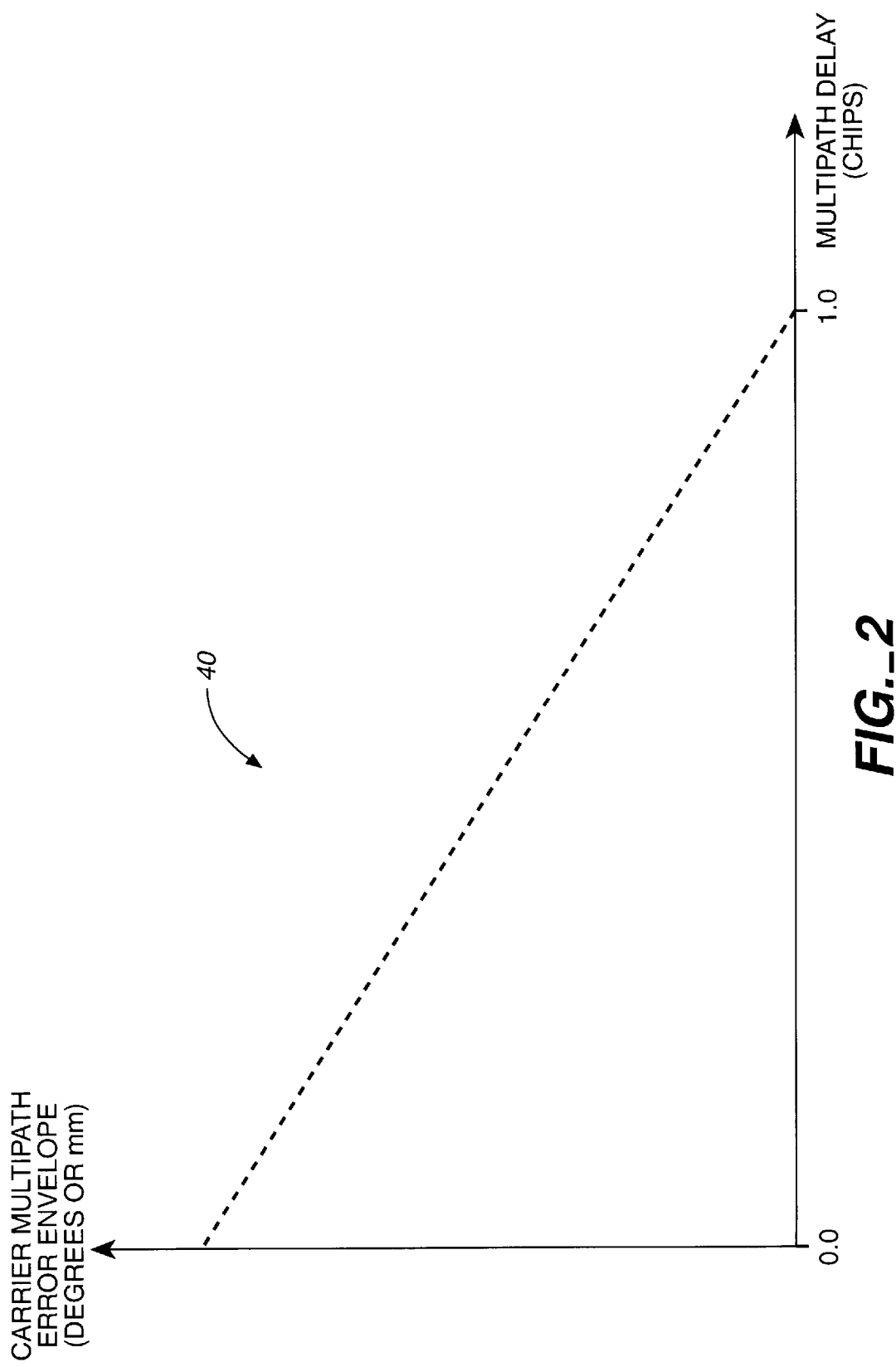
FIG._2

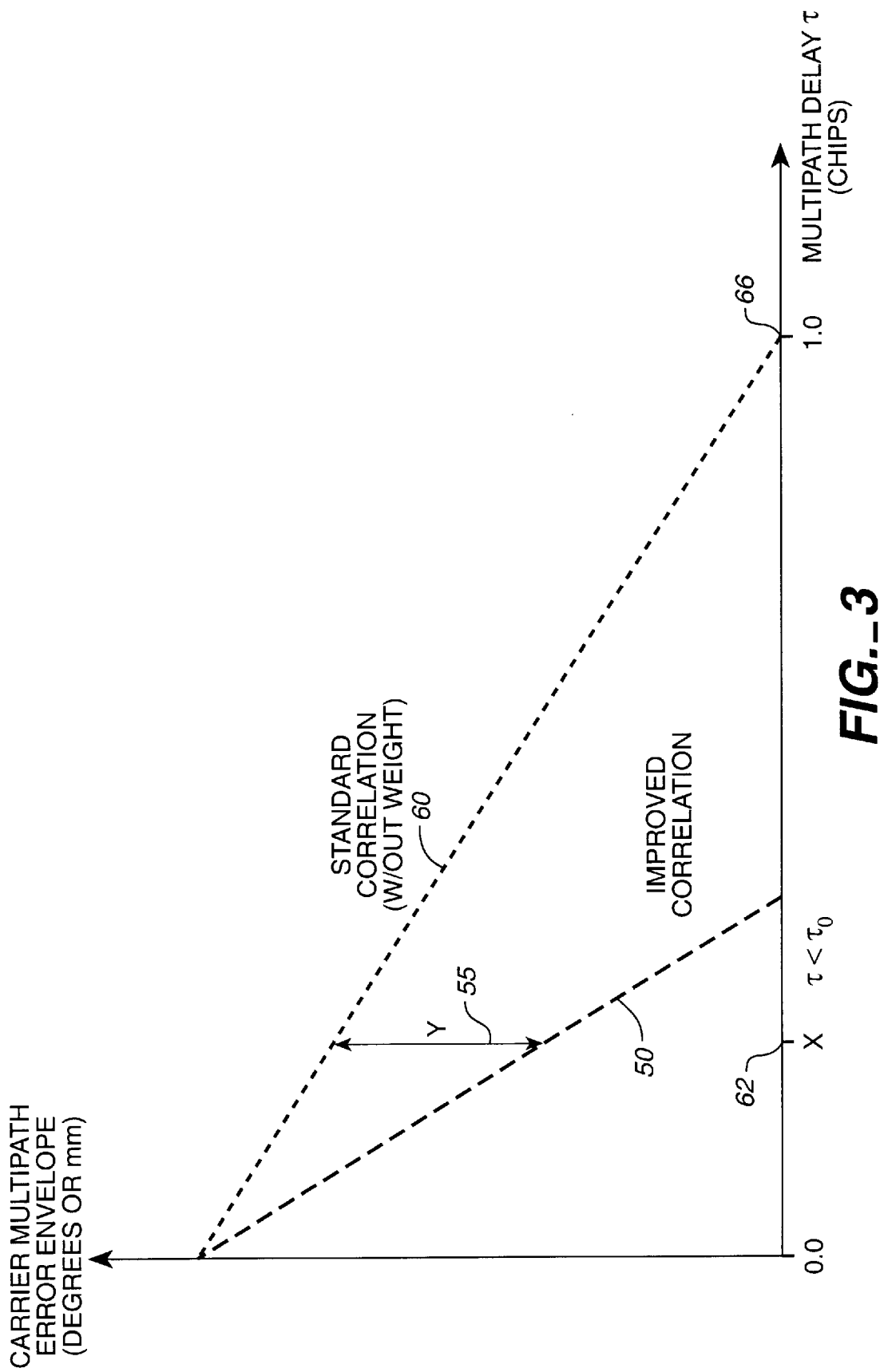
FIG._3

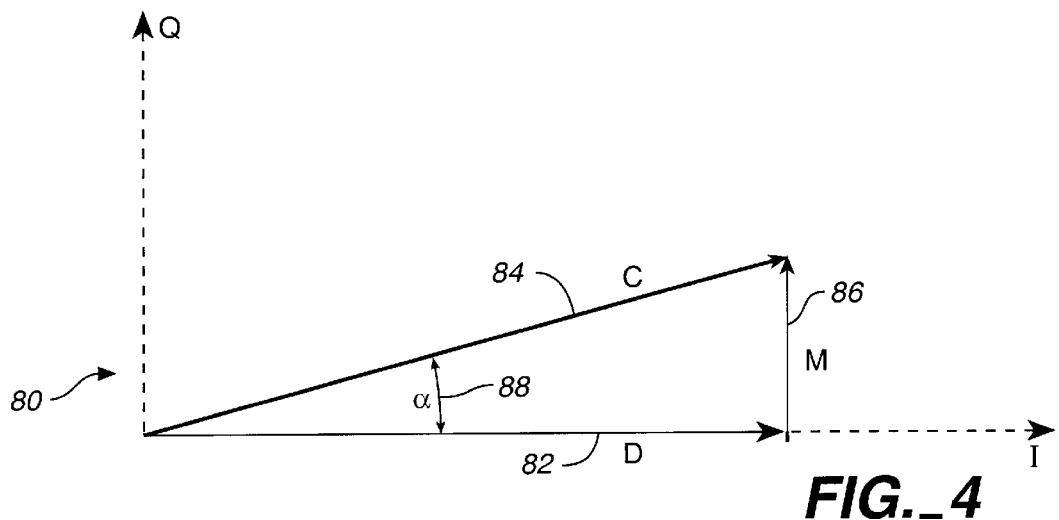
FIG._4
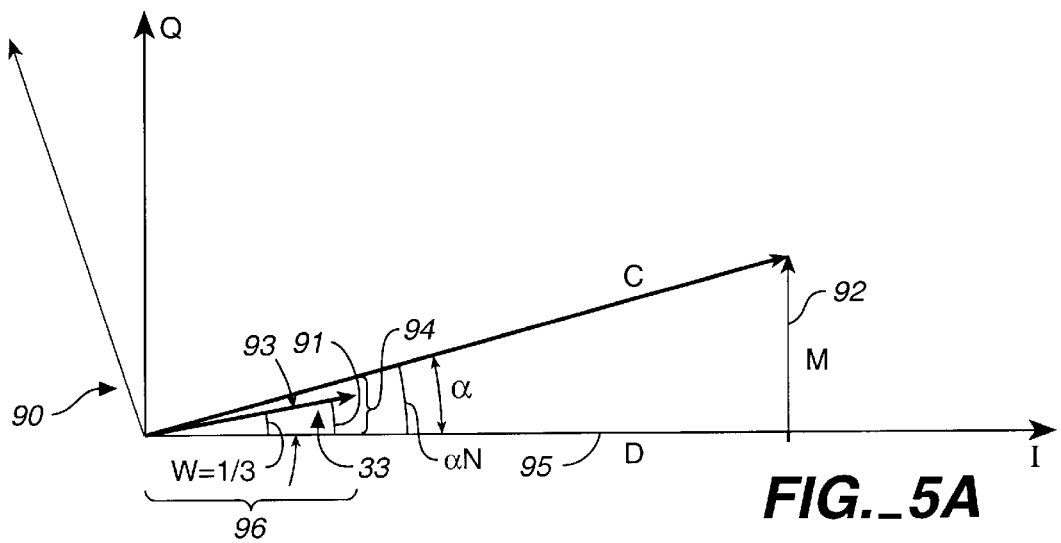
FIG._5A
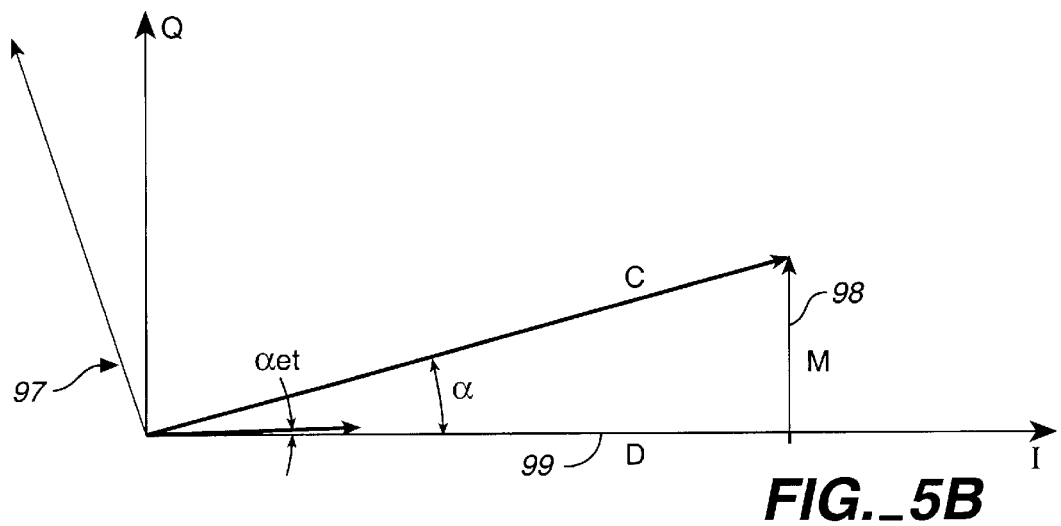
FIG._5B

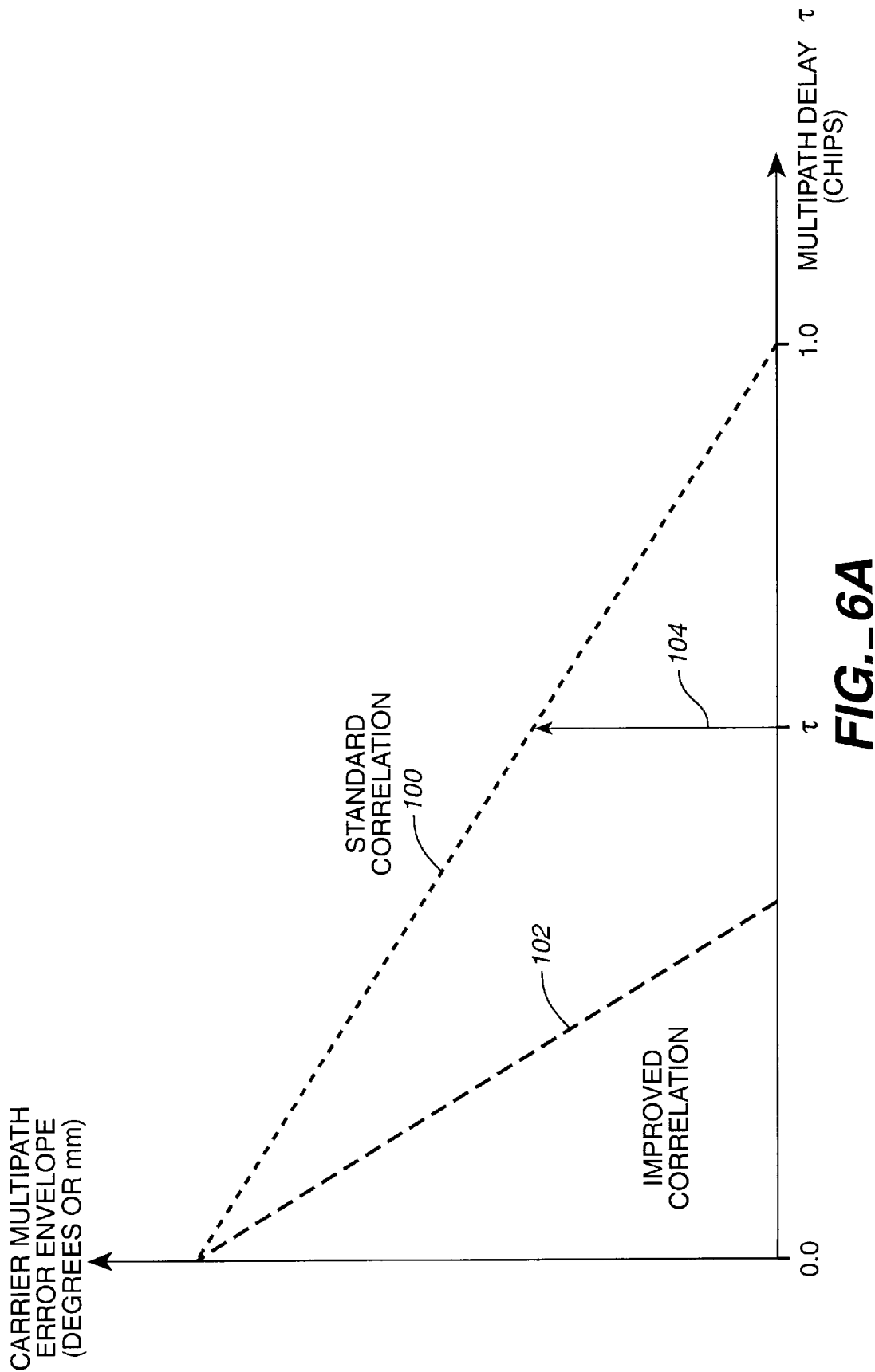
FIG._6A

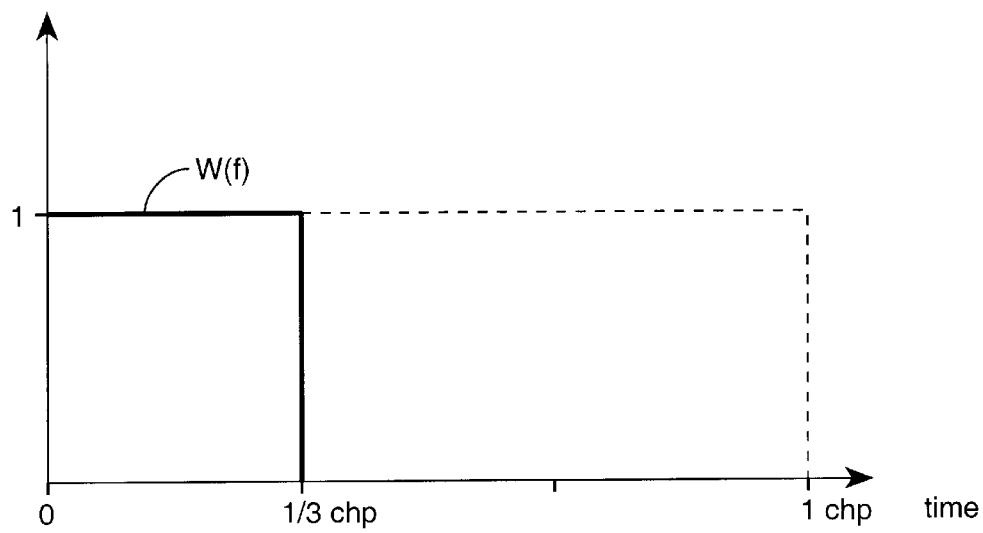
FIG._6B
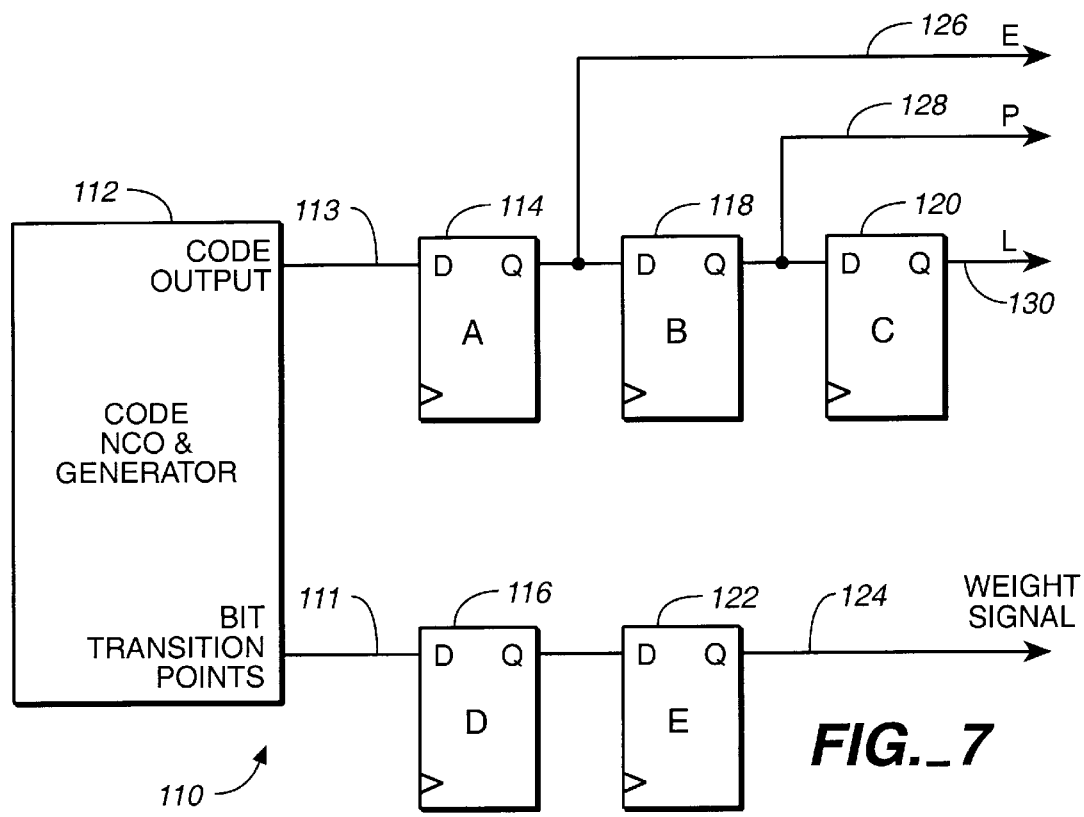
FIG._7

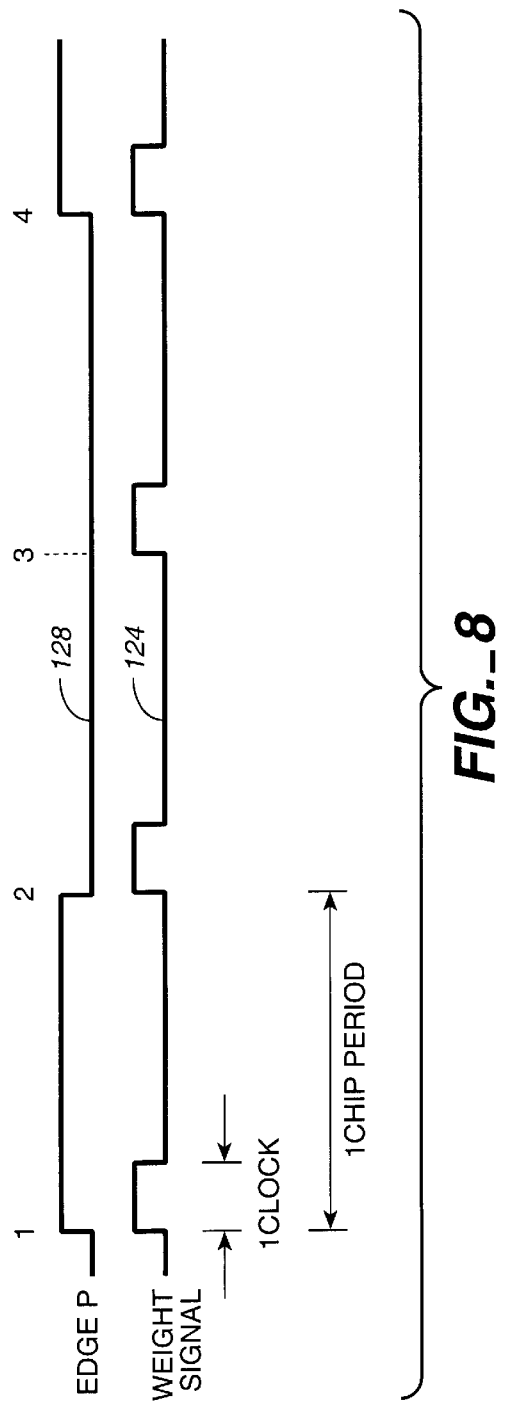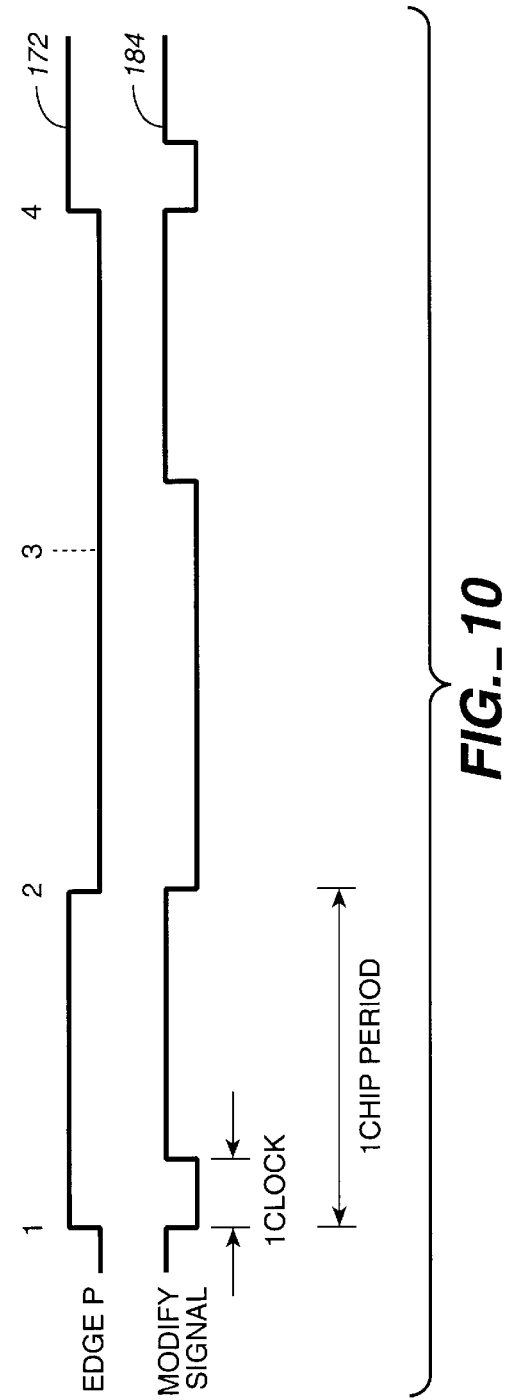

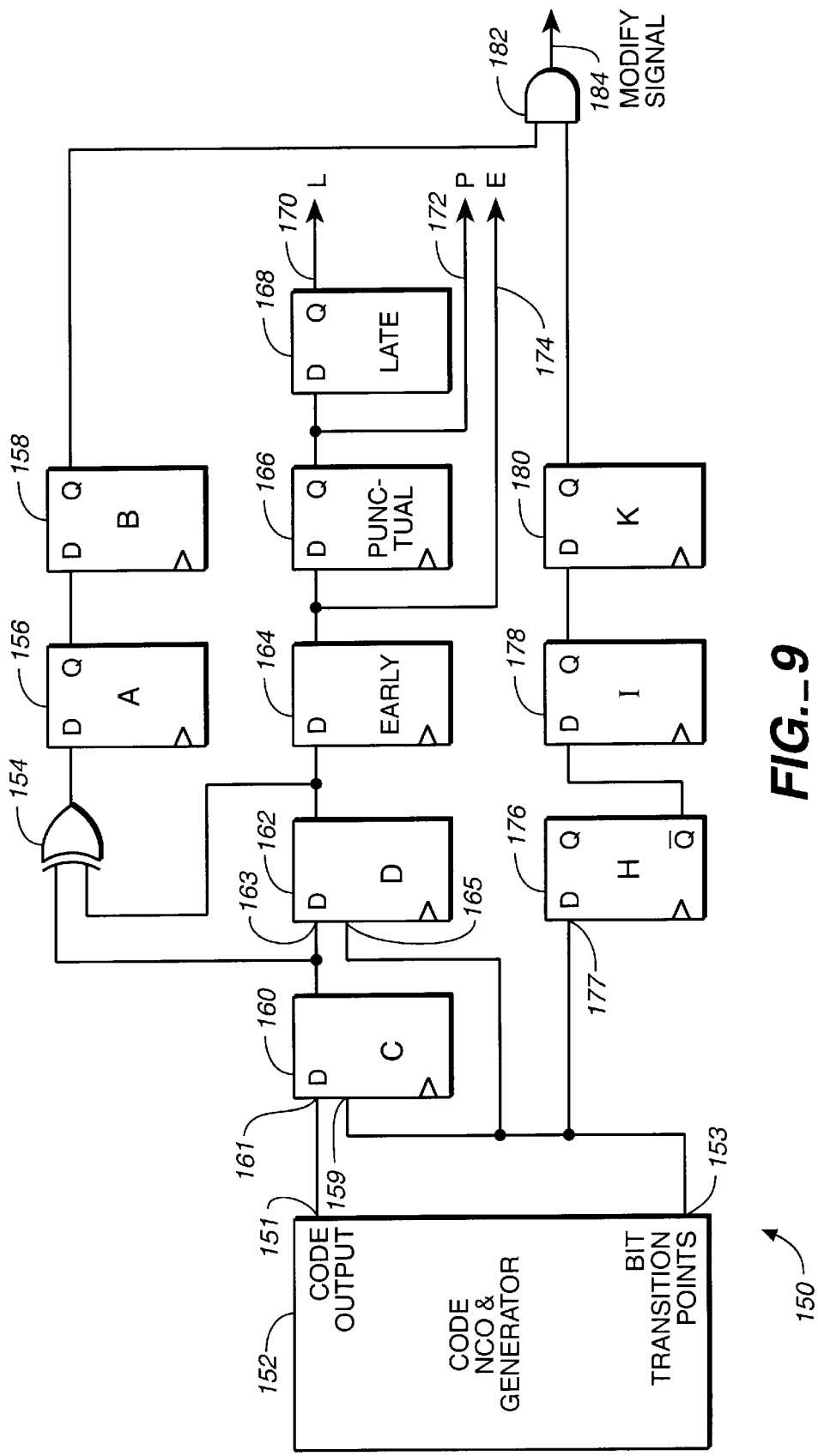
FIG._9

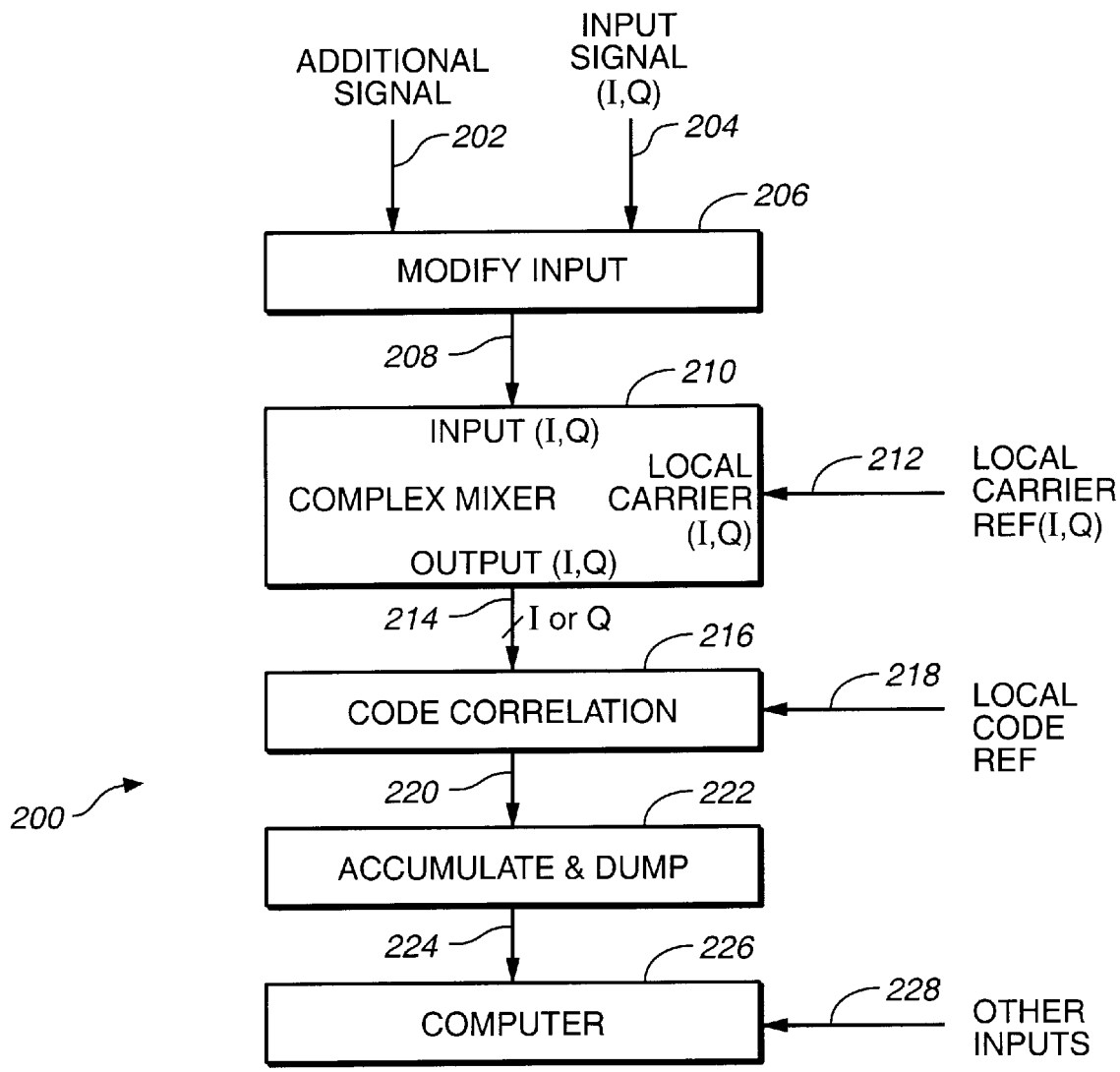
FIG._11

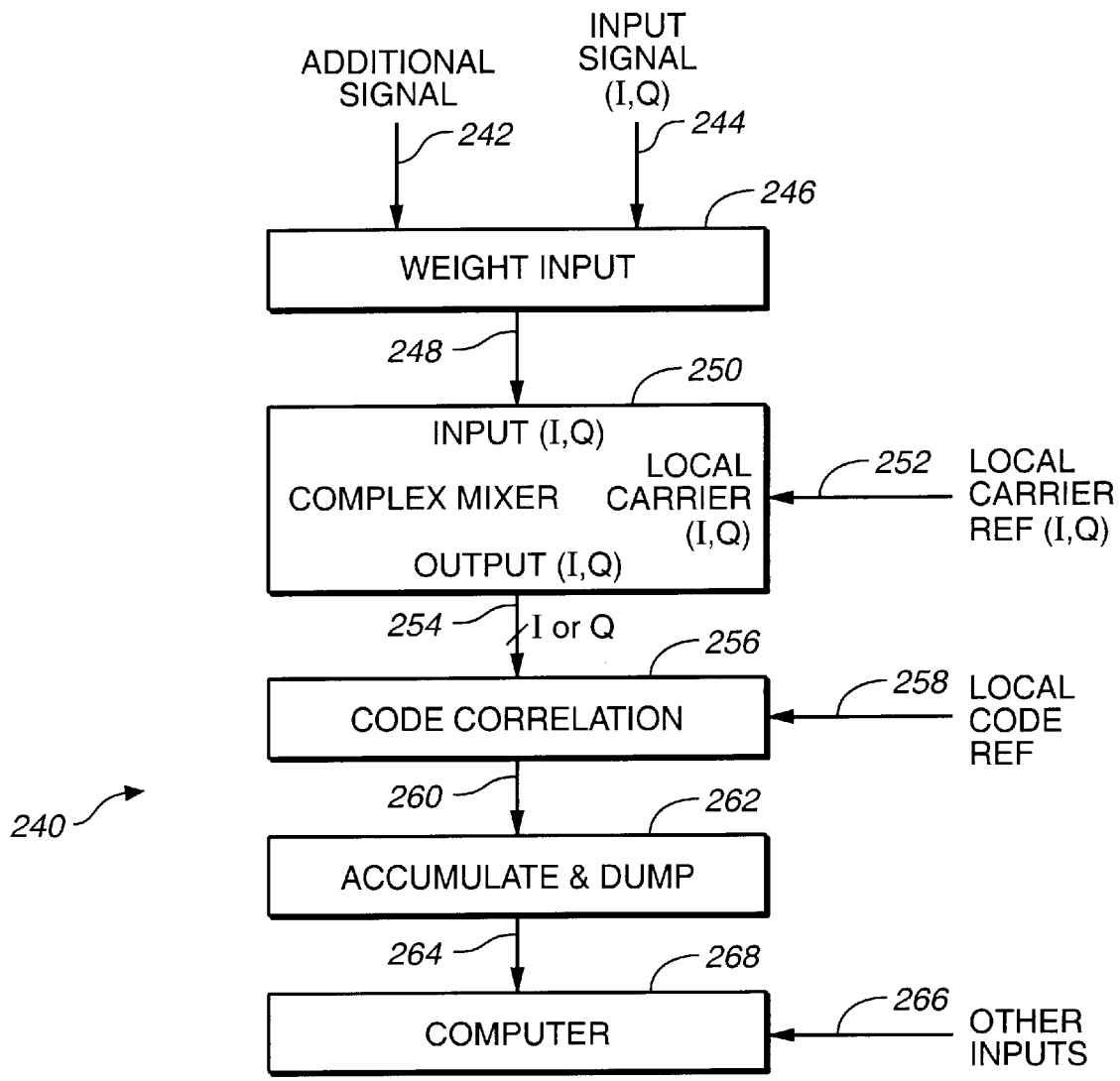
FIG._12

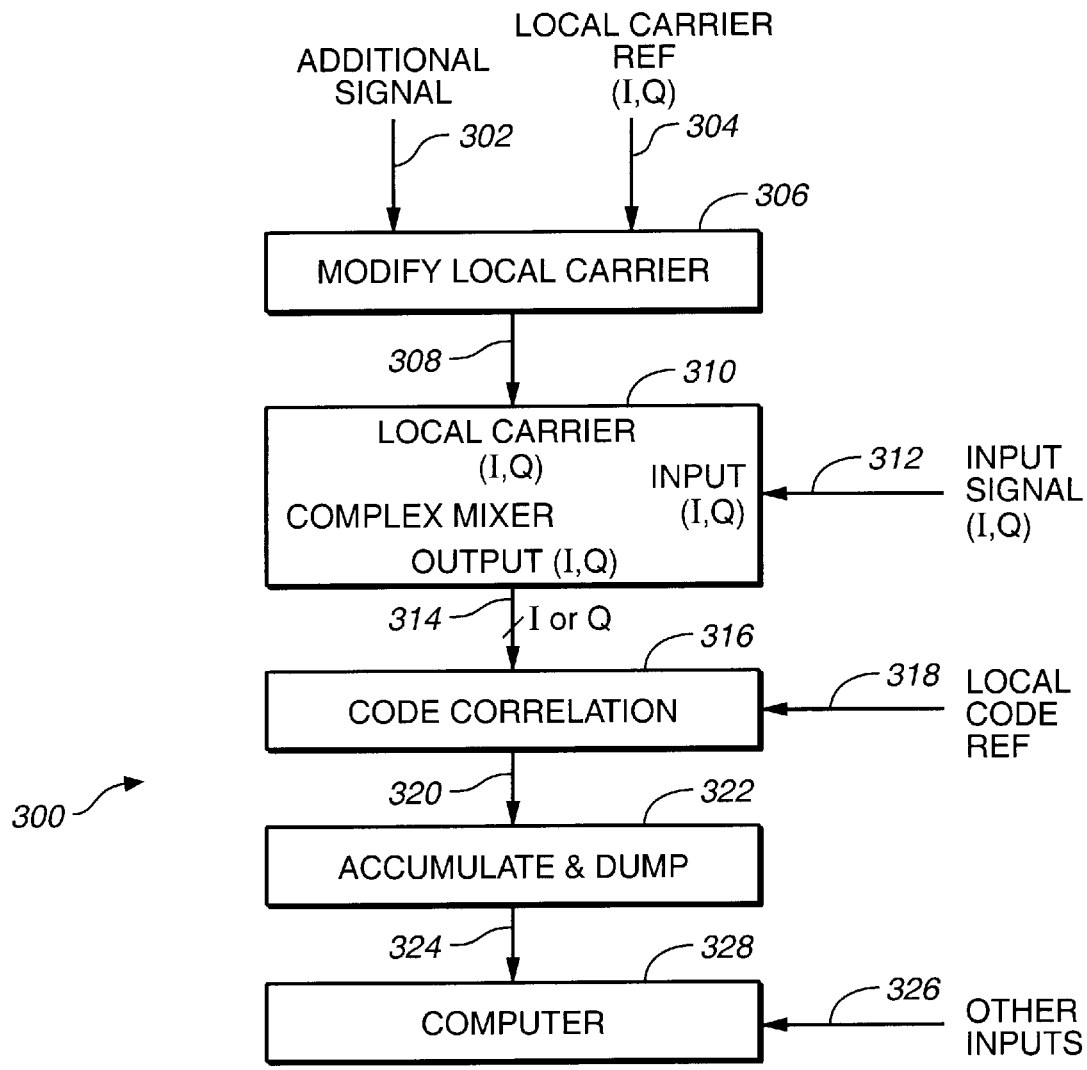
FIG._13

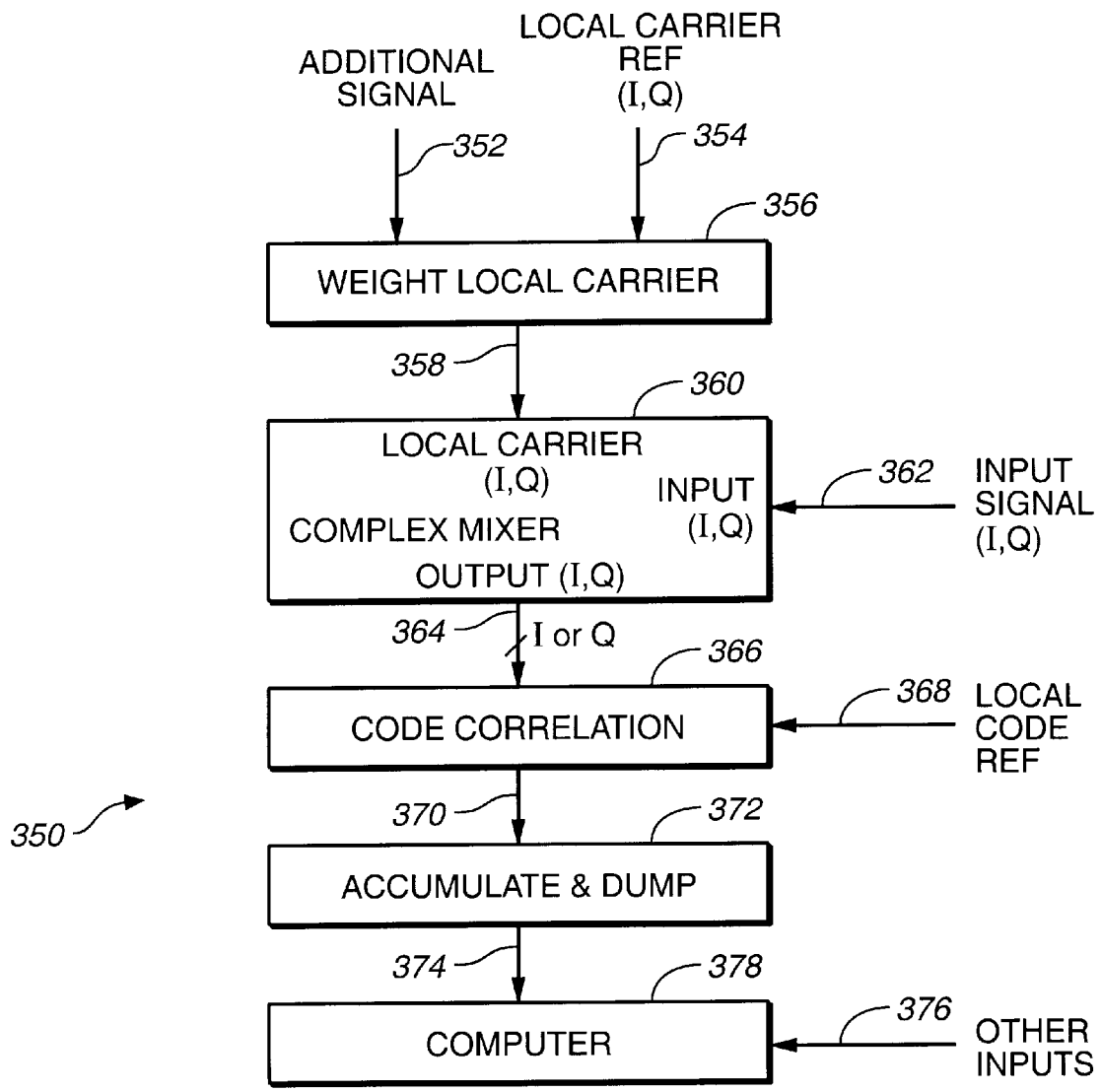
FIG._14

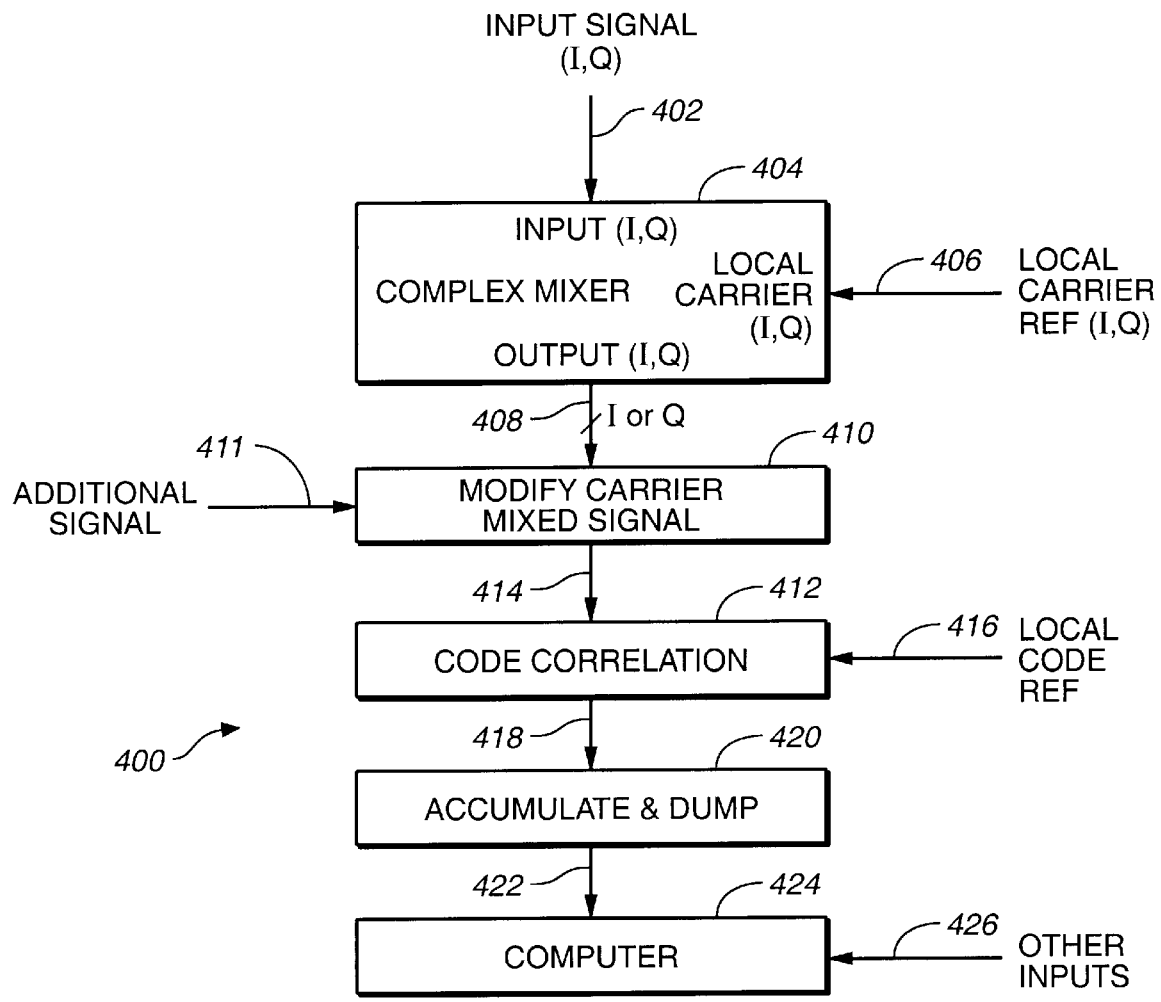
FIG._15

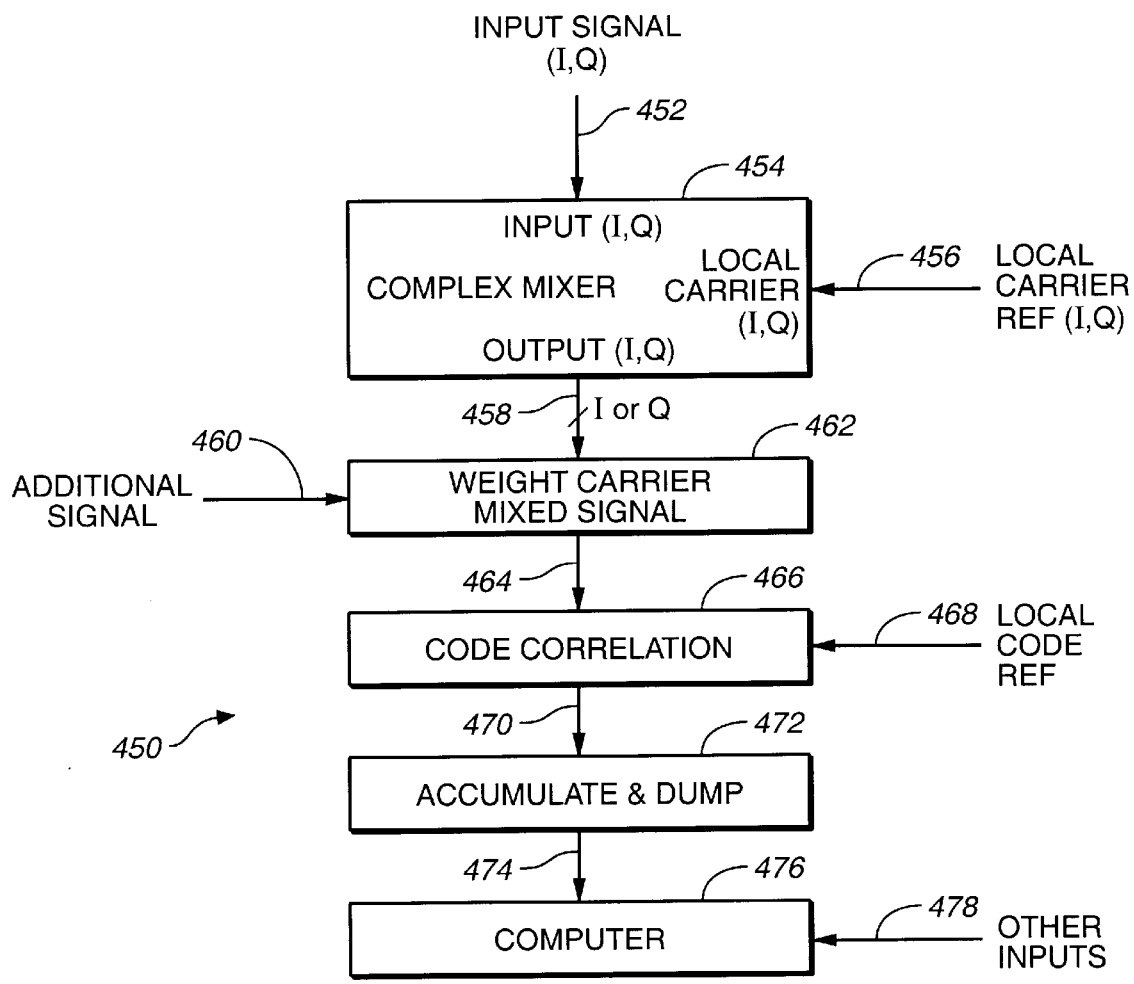
FIG._16

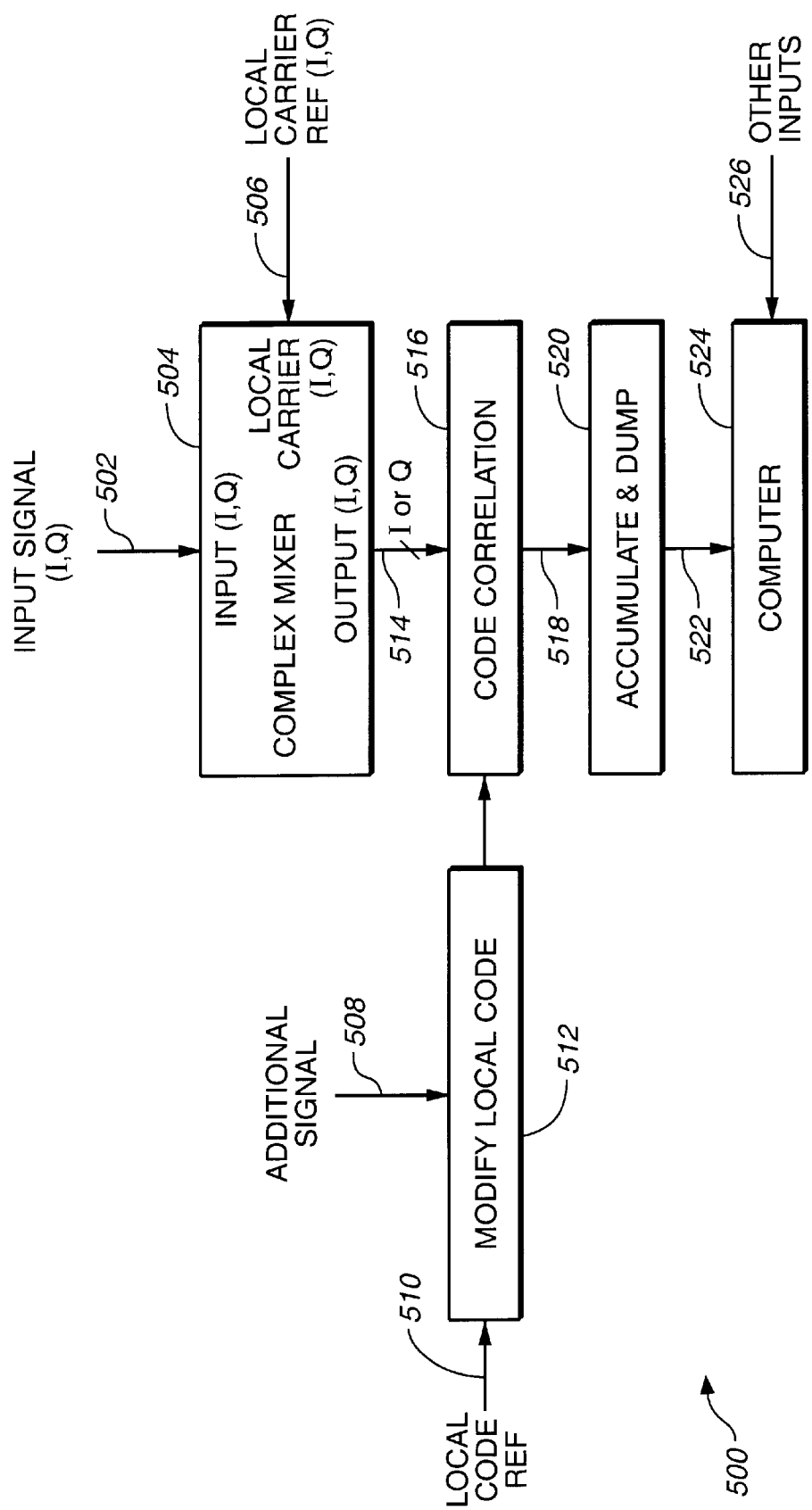
FIG._17

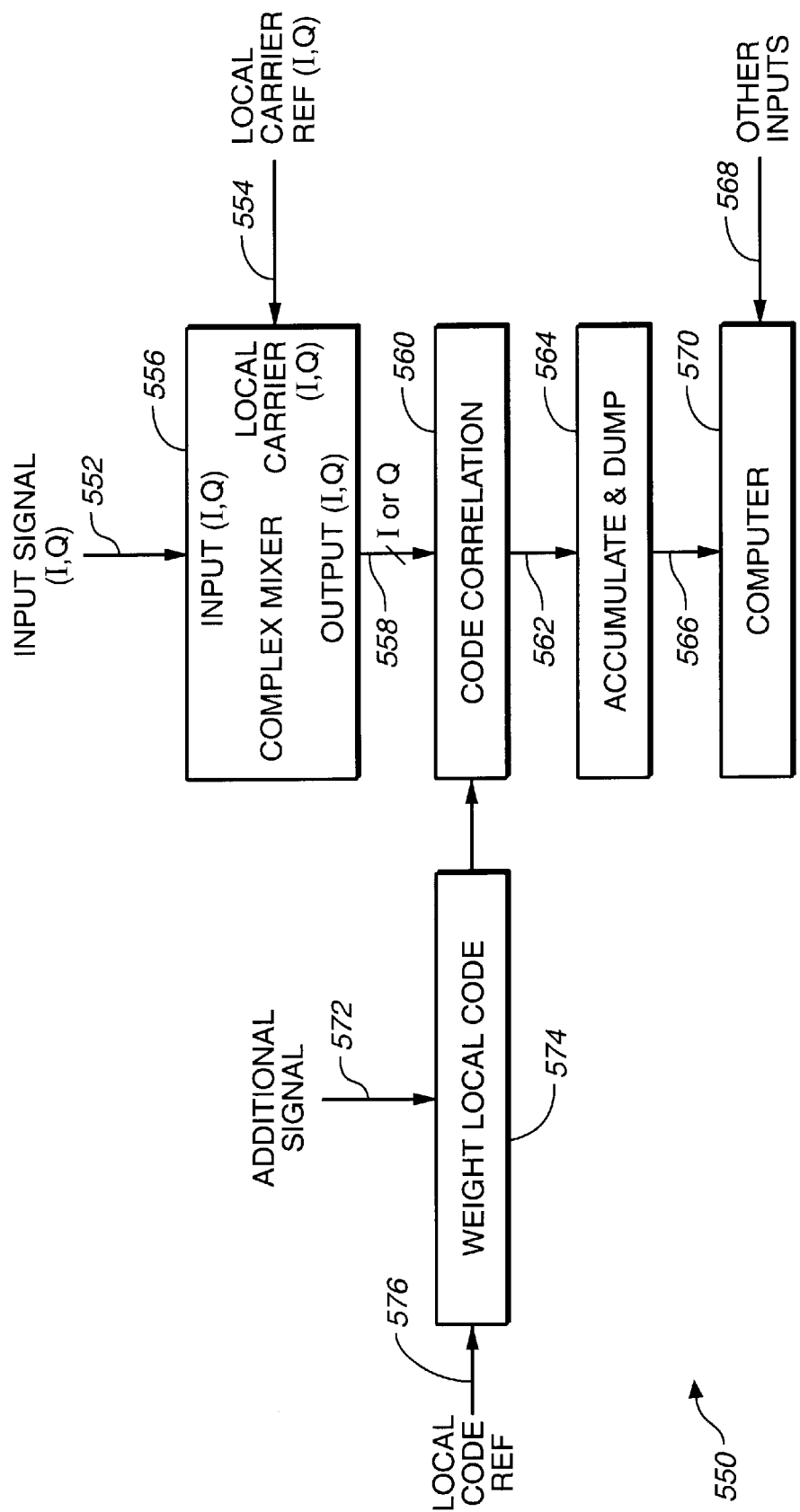
FIG._18

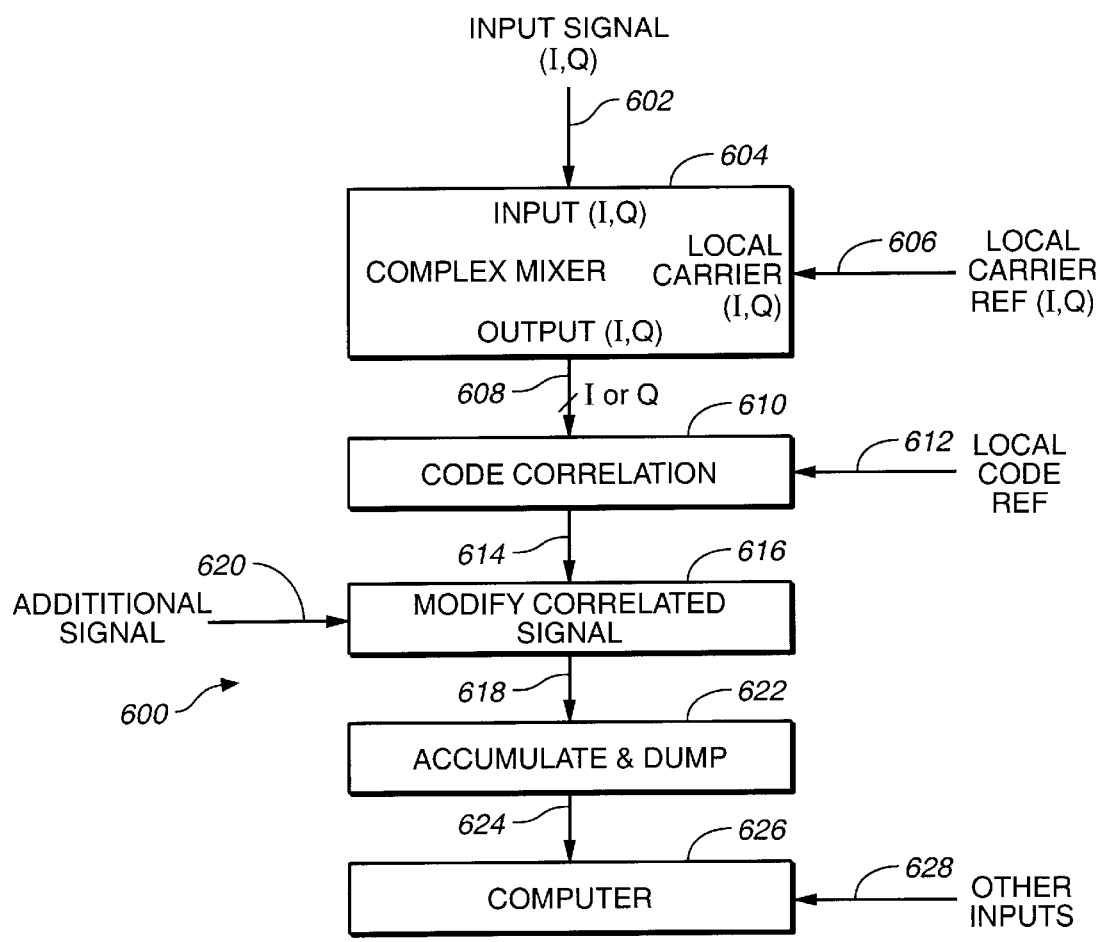
FIG._19

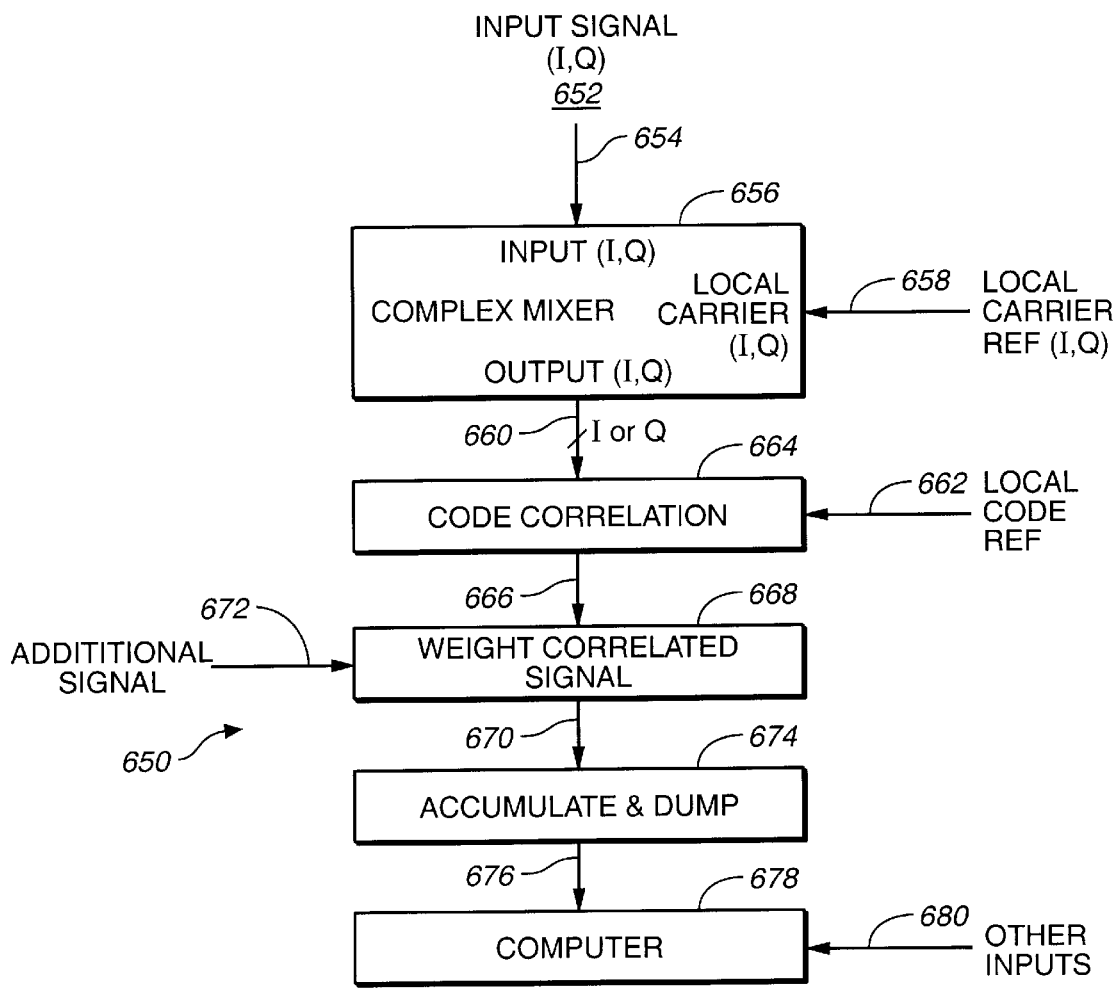
FIG._20

CARRIER MULTIPATH ESTIMATION FOR WEIGHTED OR MODIFIED TRACKING USING WEIGHTED OR MODIFIED CORRELATIONS

BACKGROUND

Reference to a Satellite Positioning System or SATPS herein refers to a Global Positioning System (GPS), to a Global Orbiting Navigation System (GLONASS), and to any other compatible satellite-based system that provides information by which an observer's position and the time of observation can be determined.

The Global Positioning System (GPS) is being developed and operated to support military navigation and timing needs. GPS represents an almost ideal dual-use technology and enjoys increased attention by civilians to explore its suitability for civil applications. The complete GPS system consists of 24 operational satellites and provides 24-hour, all-weather navigation and surveying capability worldwide. A major milestone in the development of GPS was achieved when the Initial Operational Capability (IOC) was declared as 24 satellites were successfully operating.

The implication of IOC is that commercial, national, and international civil users can rely on the availability of the Standard Positioning Service. Current policies quantify SPS as 100-meter, 95% position accuracy for a single user. Authorized (military) users will have access to the Precise Positioning Service (PPS), which provides a greater degree of accuracy. The PPS access is controlled by cryptographic means.

The GPS satellites transmit at frequencies $L1=1575.42$ MHz and $L2=1227.6$ MHz modulated with two types of codes and with a navigation message. The two types of codes are the C/A-code and the P-code. SPS is based on the C/A-code, whereas PPS is provided by the P-code portion of the GPS signal. The current authorized level of SPS follows from an intentional degradation of the full C/A-code capability. This measure is called selective availability (SA) and includes falsification of the satellite clock (SA-dither) and the broadcast satellite ephemeris (SA-epsilon), which is part of the navigation message. Despite selective availability, the C/A-code is fully accessible by civilians. The purpose of SA is to make the P-codes available only to authorized and military users. Users must be equipped with a decryption device or the "key" in order to lock onto P-codes. SA is implemented through a modification of the mathematical formula of the P-code using a classified rule. The encrypted P-code is referred to as the Y-code.

Two types of observables are of interest to users. One is the pseudo-range, which equals the distance between the satellite and the receiver plus small corrective terms due to clock errors, the ionosphere, the troposphere, and the multipath. Given the geometric positions of the satellites (satellite ephemeris), four pseudo-ranges are sufficient to compute the position of the receiver and its clock error. Pseudo-ranges are a measure of the travel time of the codes (C/A, P, or Y).

The second observable, the carrier phase, is the difference between the received phase and the phase of the receiver oscillator at the epoch of measurement. Receivers are programmed to make phase observations at the same equally spaced epochs. The receivers also keep track of the number of complete cycles received since the beginning of a measurement. Thus, the actual output is the accumulated phase observable at preset epochs.

(The above-referenced discussion is provided in the book "GPS Satellite Surveying", Second Edition, authored by Alfred Leick, and published by John Wiley & Sons, Inc. in 1995; pp 1–3.)

Both the SPS and PPS address "classical" navigation, where just one receiver observes the satellites to determine its geocentric position. Typically, a position is computed for every epoch of observation.

However, in the surveying and geodesy applications the relative or differential positioning is used, wherein the relative location between the receivers is determined. In this case, many of the common mode errors cancel or their impact is significantly reduced. This is particularly important in the presence of selective availability.

The multipath errors originate with contamination of SATPS signals by delayed versions of these signals. For some applications using either pseudo-range or carrier phase observables, multipath is the dominant error source. The most direct approach for reducing this error is to select an antenna site distant from reflecting objects, and to design antenna/back plane combinations to further isolate the antenna from its surroundings. In some cases, however, antennas must be located in relatively poor sites, and other techniques for carrier multipath reduction are required.

One such technique for carrier multipath reduction was disclosed by Rayman Pon and Dominic Farmer in the U.S. patent application Ser. No. 08/650,817, entitled "Weighted carrier phase multipath reduction", filed on May 20, 1996 (patent application #1), that was assigned to the assignee of the present patent application. Patent application #1 is specifically referred to in the present patent application and is incorporated herein by reference in its entirety. In patent application #1 the weighted carrier tracking process was used in order to decrease the carrier multipath error signal.

In U.S. Pat. No. 5,917,866, entitled "Code multipath estimation using weighted or modified correlations", filed on Apr. 4, 1997 and issued on Jun. 29, 1999, (patent #1), Rayman Pon disclosed the weighted and modified techniques for estimation and minimization of the code multipath errors. Patent #1 is also specifically referred to in the present patent application and is incorporated herein by reference in its entirety.

SUMMARY

In the present patent application both weighted and modified techniques for estimation and minimization of the carrier multipath error signals are disclosed.

One aspect of the present invention is directed to an apparatus for use in decoding a composite signal. The composite signal includes a signal from a transmitter and a distortion component.

In one embodiment, the apparatus comprises: (1) a tracking circuit configured to receive the composite signal comprising at least two partial tracking circuits; and (2) at least one additional circuit. Each tracking circuit generates a tracking function having a distortion component response envelope. Each additional circuit is configured to generate an additional signal that is used to estimate and minimize the distortion component response envelope.

In the preferred embodiment, the transmitter includes at least one communication satellite, wherein the composite signal includes a direct signal transmitted from at least one satellite and a carrier multipath distortion component. In this embodiment, the tracking circuit comprises at least two satellite partial tracking circuits. Each satellite channel tracking circuit generates a satellite carrier tracking function having a carrier multipath error response envelope. In this embodiment, each additional circuit is configured to estimate and minimize the carrier multipath error response envelope of the satellite carrier tracking function.

In one embodiment, at least one partial tracking circuit further comprises a Weight partial tracking circuit, and the entire tracking circuit is configured to provide a satellite carrier tracking function having a carrier multipath error response envelope.

In another embodiment, at least one partial code tracking circuit further comprises a Modify partial tracking circuit, and the entire tracking circuit is configured to provide a satellite carrier tracking function having a carrier multipath error response envelope.

In one more embodiment, at least one additional circuit further comprises a Weight estimation circuit configured to estimate and minimize a carrier multipath error response envelope of the carrier tracking function.

Yet, in another embodiment, at least one additional circuit further includes a Modify estimation circuit configured to estimate and minimize a carrier multipath error response envelope of the carrier tracking function.

There are five preferred embodiments for each of: (a) Weight partial tracking circuit, (b) Modify partial tracking circuit, (c) Weight additional circuit, and (d) Modify additional circuit.

In the first preferred embodiment, the Weight (or Modify) partial tracking circuit further comprises an (I & Q) Input Weight (or Modify) tracking circuit configured to process the input composite signal from the satellite to generate an (I & Q) weighted (or modified) component of the (I & Q) input composite signal.

In the second preferred embodiment, the Weight (Modify) partial tracking circuit comprises an (I & Q) Weight (Modify) Local Carrier reference circuit configured to generate an (I & Q) weighted (modified) component of an (I & Q) local carrier reference signal.

In the third preferred embodiment, the Weight (Modify) partial tracking circuit comprises an (I & Q) Weight (Modify) Complex Mixer circuit configured to generate an (I & Q) weighted (modified) component of a baseband sampled composite signal.

In the fourth preferred embodiment, the Weight (Modify) partial tracking circuit comprises a Weight (Modify) Local Code reference circuit configured to locally generate a Local code weighted (modified) reference signal.

Finally, in the fifth preferred embodiment, the Weight (Modify) partial tracking circuit comprises a Weight (Modify) Code Correlation circuit configured to generate a weighted (modified) correlation component of a composite correlation signal.

In the first preferred embodiment, the Weight (Modify) estimation circuit configured to estimate and minimize a carrier multipath error response envelope of the satellite carrier tracking function comprises an (I & Q) Input Weight (or Modify) estimation circuit configured to generate an additional (I & Q) weighted (or modified) component of the (I & Q) input composite signal.

In the second preferred embodiment, the Weight (Modify) estimation circuit configured to estimate and minimize a carrier multipath error response envelope of the satellite carrier tracking function comprises an (I & Q) Weight (Modify) Local Carrier estimation circuit configured to generate an additional (I & Q) weighted (modified) component of an (I & Q) local carrier reference signal.

In the third preferred embodiment, the Weight (Modify) estimation circuit configured to estimate and minimize a carrier multipath error response envelope of the satellite carrier tracking function comprises a Quadrature Channel Weight (Modify) Complex Mixer estimation circuit configured to generate an additional (Q) weighted (modified) component of a baseband sampled composite signal.

In the fourth preferred embodiment, the Weight (Modify) estimation circuit configured to estimate and minimize a carrier multipath error response envelope of the satellite carrier tracking function comprises a Weight (Modify) Local Code estimation circuit configured to locally generate an additional Local code weighted (modified) reference signal.

Finally, in the fifth preferred embodiment, the Weight (Modify) estimation circuit configured to estimate and minimize a carrier multipath error response envelope of the satellite carrier tracking function comprises a Weight (Modify) Local Code Correlation circuit configured to generate an additional weighted (modified) component of a composite correlation signal.

Another aspect of the present invention is directed to a method for decoding a satellite composite signal including a satellite signal and a carrier multipath distortion component. The method comprises the following steps: (1) tracking the composite signal by a satellite tracking circuit, wherein the tracking circuit is configured to generate a tracking function having a carrier multipath distortion response envelope; (2) generating at least one additional signal by at least one additional circuit; and (3) estimating and minimizing the carrier multipath distortion response envelope using at least one additional signal.

BRIEF DESCRIPTION OF THE DRAWINGS

FIG. 1 depicts the general diagram of the apparatus of the present invention.

FIG. 2 shows the carrier multipath error envelope for the standard correlation (unweighted and unmodified).

FIG. 3 illustrates the comparison between the standard and improved carrier phase multipath error envelopes for small delays.

FIG. 4 shows the tracking direct, composite, and multipath signals in the carrier tracking coordinate system (I & Q).

FIG. 5A depicts the tracking direct, composite, and multipath signals, and the estimation composite signal for small delays in the carrier tracking coordinate system (I & Q)

FIG. 5B illustrates the tracking direct, composite, and multipath signals, and the estimation composite signal for large delays in the carrier tracking coordinate system (I & Q).

FIG. 6A shows the comparison between the standard and improved carrier phase multipath error envelopes for large delays.

FIG. 6B illustrates the weighting function W(t).

FIG. 7 is a depiction of a generator of a Weight signal.

FIG. 8 illustrates the timing signals of the Weight signal generator of FIG. 7.

FIG. 9 shows a generator of a Modify signal.

FIG. 10 depicts the timing signals of the Modify signal generator of FIG. 9.

FIG. 11 shows the Modify Input signal embodiment of the apparatus of the present invention.

FIG. 12 depicts the Weight Input signal embodiment of the apparatus of the present invention.

FIG. 13 illustrates the Modify Local Carrier Reference signal embodiment of the apparatus of the present invention.

FIG. 14 shows the Weight Local Carrier Reference signal embodiment of the apparatus of the present invention.

FIG. 15 illustrates the Modify Carrier Mixed signal embodiment of the apparatus of the present invention.

FIG. 16 depicts the Weight Carrier Mixed signal embodiment of the apparatus of the present invention.

FIG. 17 is an illustration of the Modify Local Code Reference signal embodiment of the apparatus of the present invention.

FIG. 18 depicts the Weight Local Code Reference signal embodiment of the apparatus of the present invention.

FIG. 19 is a depiction of the Modify Correlated signal embodiment of the apparatus of the present invention.

FIG. 20 depicts the Weight Correlated signal embodiment.

FULL DESCRIPTION OF THE PREFERRED EMBODIMENTS

In general, the subject of the present invention comprises an apparatus and a method for use in decoding an arbitrary composite signal (CS) (not necessarily a satellite signal) that includes a distortion component. In particular, the present invention can relate to the radio receivers of the satellite signals that include carrier multipath distortion component.

Usage of weighting signals for reduced carrier multipath tracking was disclosed in patent application #1. Usage of weighting and modified signals for reduced code multipath tracking was disclosed in patent #1. In the current patent application, the applicant discloses usage of weighting or modified estimation techniques for the purposes of estimation and minimization of the carrier multipath signals.

The apparatus (10) that performs the above-identified functions is shown in FIG. 1. A carrier tracking channel uses at least two partial blocks (12 and 14) which respectively obtain the inphase (I) and quadrature (Q) correlations which are used for carrier tracking purposes. Each of these partial blocks can use unweighted or unmodified correlations (standard case), weighted correlations, or modified correlations to obtain the I and Q correlations which are used for carrier tracking. Usage of the standard correlations for both I and Q partial circuits without extra weight or modify functions will not provide any reduction in the carrier multipath distortion signal. On the other hand, the usage of weighted or modified correlations in at least one of the partial circuits can provide reduced carrier multipath as compared with the standard tracking circuit.

The additional circuits (16, 18 of FIG. 1) can be used to provide the additional correlations using either weighted or modified correlation techniques. The correlation techniques used for estimation of the remaining carrier multipath is independent of the tracking method. Therefore, all combinations of unweighted, unmodified, weighted or modified carrier tracking correlations (blocks 12, 14 of FIG. 1) and weighted or modified estimation correlations (blocks 16, 18 of FIG. 1) are possible. For carrier tracking purposes, the apparatus of the present invention should include at least two correlation channels: an inphase (I) correlation channel (12) and a quadrature (Q) correlation channel (14). On the other hand, for estimation purposes, the apparatus of present invention should include at least one quadrature (Q) correlation channel (16). The additional inphase and/or quadrature channels (18) are optional.

In each tracking or estimation circuit the Weight or Modify signals can be applied at five different levels (see discussion below) to achieve the reduction of the carrier multipath error signals.

It is important to have the right perspective of the relative importance of the code and carrier multipath reduction. The carrier multipath reduction is important as the next step after the code multipath reduction has already been taken care of. Indeed, the code correlation with the minimized code multipath error allows one to obtain a more accurate search area (in the properly defined space of integers) for the purposes of resolving the integer ambiguity which is increasingly important in GPS survey applications. After the accurate area of search is found, the reduction of the carrier multipath allows more accurate and faster resolution of the integer ambiguity; that is, to find how many carrier wavelengths the satellite signals actually traveled from their inception point to their reception point. The reduction of the carrier multipath also allows one to obtain more accurate final solution results which are based on carrier phase data (such as surveying results).

The carrier multipath reduction was achieved in patent application #1 by using the weighting signals. Indeed, usage of weighting correlation reduced the number of samples because some of the samples corresponded to the weighting function equal to zero. However, the standard measurement noise (not multipath noise) is increased for the same reason the multipath noise is decreased—because the number of samples is reduced.

Indeed, the signal-to-noise ratio (SNR) is proportional to $[N^2$ (the signal is correlated)/N (the standard noise is not correlated)]~N, wherein N is the number of samples.

As shown in patent application #1, the Modify operation is equivalent to the Weight operation in terms of the code multipath reduction. As it is shown below, the same is true for the carrier multipath reduction.

Indeed, in the current patent application both weighting and modification methods of decreasing the carrier multipath error are disclosed. The reduction in the number of samples occurs only in the weighted embodiment. In the modified embodiment, the number of out-of correlation samples is increased at the expense of the reduction of the in-correlation samples. However, both the reduction of the number of samples or the reduction of the in-correlation samples lead to the same result: reduction of the carrier multipath error.

FIG. 2 shows the carrier multipath error envelope (40) for the standard correlation tracking (unweighted and unmodified) as disclosed in detail in patent application #1. FIG. 2 shows the positive sense multipath error envelope (40). There is a symmetrical negative sense multipath error envelope (not shown) which is essentially the same curve mirrored about the x-axis.

The actual phase error of the composite signal is zero at zero multipath delay, which FIG. 2 does not reflect because it shows only the error envelope α. For the actual phase error (not shown), the error begins at 0 for 0 multipath delay, then rises to its peak positive value at approximately ¼ wavelength delay. The curve then drops to zero and then reaches its peak negative value at approximately ¾ wavelength delay. This cyclical multipath error response as a function of multipath delay continues with a period of one wavelength with the peaks following the error envelope α. For delays longer than 1 chip (for example, for GPS C/A code 1 chip is equal to 293 meter) there is no multipath error on the carrier phase for the standard correlations.

The curve (40) of FIG. 2, assumes an infinite BW (bandwidth). In practice the BW is limited. This will have the effect of rounding the triangle peak of the error envelope near zero multipath delay. Otherwise, the basic shape of the error envelope is essentially correct.

FIG. 3 depicts the standard (60) and improved (50) carrier phase multipath error envelopes for small delays X (62). For the improved carrier correlation the Weight and/or Modify tracking and/or estimation techniques can be used. When the Modify carrier tracking/estimation is used instead of Weight carrier tracking/estimation, the Weight functions that multiply the pertinent signals are replaced by the Modify functions that add to the pertinent signals. The overall result of application of the Weight or Modify carrier tracking/estimation is the reduction Y (55) of the carrier multipath error envelope for small delays X (62).

However, as was noted above, the reduced multipath error envelope after weighted or modified, tracking or estimation, correlations is obtained at the expense of the increased noise in the correlation values as compared with the standard tracking.

FIG. 6A shows that for large delays $\tau > \tau_0$ (104) the improved correlation (102) (due to the weighted and/or modified tracking/or estimation) has a multipath error signal equal to zero.

FIG. 4 depicts the direct D (82), composite C (84), and multipath M (86) signals in the tracking coordinate system (I & Q) for the standard tracking circuit.

The standard carrier tracking loop would produce zero multipath error if we could lock on the direct incoming signal that does not have the multipath component. However, for all real situations, an incoming signal is always a composite signal that includes a multipath error component signal. Thus, we can lock only on an incoming composite signal and cannot lock on an incoming direct signal.

The closing of a carrier loop (or lock) between a locally generated carrier signal and an incoming carrier signal means that the carrier phase between the incoming signal and the locally generated signal is zero. Therefore, the standard carrier tracking loop can drive the phase between a locally generated carrier signal and an incoming composite carrier signal (with the multipath error) to zero when the carrier loop locks on the incoming composite signal. On the other hand, as was explained above, the phase between a locally generated carrier signal and an incoming direct carrier signal (without multipath error) can not be driven to zero because a direct incoming carrier signal does not exist: the incoming satellite signal always includes a multipath error signal. As shown in FIG. 4, this results in the multipath phase error $\alpha$ (88).

For small multipath amplitude M<<D, when the phase of the multipath signal (86) with respect to the direct signal (82) is 90 degrees, the multipath phase error is:

$$\alpha(\tau) \sim M(W, \tau)/D(W);$$

wherein W is a weighting function ( as an example, W(t) is shown in FIG. 6B), and $\tau$ is a multipath delay.

The multipath phase error $\alpha(\tau)$ does not depend on the weighting function W because the weighting modifies the gain of the multipath M signal and the gain of the direct D signal by the same amount.

However, the multipath phase error $\alpha$ ($\tau$) does depend on multipath delay $\tau$ because the multipath error M depends on delay $\tau$: M=M ($\tau$), as shown in FIG. 3 for small delays and in FIG. 6A for large delays.

More specifically, for large delays, as shown in FIG. 6A, the multipath error envelope $M_{EST}$ for the estimation circuit is zero, and therefore the multipath phase error $\alpha$ ($\tau$) is also zero:

$\alpha=0$ for large delays (for the example of weighting function shown in FIG. 6B. See also FIG. 5B.)

On the other hand, for small delays, as shown in FIG. 3, the multipath error envelope for estimation circuit $M_{EST}$ (50) is smaller then the multipath error envelope for the standard tracking circuit $M_{TRACKING}$ (60) by the value Y (55):

$$\alpha_{EST}(\tau)/\alpha_{TRACKING}(\tau) \sim M_{EST}/M_{TRACKING} < 1 \text{ for small delays.}$$

See also FIG. 5A.

In one embodiment, the apparatus (10) of FIG. 1 of the present invention requires two partial circuits (in I and Q channels) and one additional circuit (in Q channel). The two partial circuits provide carrier tracking using the I and Q correlations which can be standard, weighted and/or modified. The additional circuit provides a weighted or modified Q correlation for estimation. As was mentioned above, to infer the phase error from just a Q estimation correlation, the corresponding I value can be obtained from an appropriately scaled version of the I tracking correlation. The phase error due to multipath in general is fairly small, so that the result is not very sensitive to the accuracy of the I value.

In another embodiment, the estimation circuit includes both I and Q channels that provide a weighted, modified, or any combination of weighted or modified correlations for estimation purposes.

In one embodiment, FIG. 7 provides a generator (110) of Weight signal (124) that can be used by a tracking circuit or by an additional estimation circuit. Code NCO & Generator (112) is configured to generate a local code signal. An A flip-flop (114) is configured to generate an Early signal (126), a B flip-flop (118) generates a Punctual signal (128), and a C flip-flop (120) generates a Late signal (130). A D flip-flop (116) is connected to a bit transition point output (111) of the Code NCO & Generator (112). An E flip-flop (122) generates a Weight signal (124).

FIG. 8 illustrates the Punctual (128) and Weight (124) signals of the Weight generator (110) of FIG. 7.

In one embodiment, the generator (150) of Modify signal (184) is shown in FIG. 9. A Code NCO & Generator (152) is configured to generate a local code signal. A data input (161) of the C flip-flop (160) is connected to a code output (151) of the NCO & Generator (152), and an enabling input (159) of the C flip-flop (160) is connected to a bit transition point output (153) of the Code NCO & Generator (152). The C flip-flop is configured to generate a C signal.

A data input (163) of a D flip-flop (162) is connected to the C flip-flop (160), and an enabling input (165) of the D flip-flop is connected to the bit transition point output (153) of the Code NCO & Generator. The D flip-flop is configured to generate a D signal.

An Early flip-flop (164) is connected to the D flip-flop and is configured to generate an Early signal (174), wherein a Punctual flip-flop (166) is connected to the Early flip-flop and is configured to generate a Punctual signal (172). A Late flip-flop (168) is connected to the Punctual flip-flop and generates a Late signal (170). An EX-OR gate (154) gates the C and D signals to an A flip-flop (156). A B flip-flop (158) is connected to the A flip-flop and generates a B signal.

A data input (177) of an H flip-flop (176) is connected to a bit transition output (153) of the Code NCO & Generator. The H flip-flop is configured to generate an H signal. An I flip-flop (178) is connected to the H flip-flop (176) and generates an I signal, wherein a K flip-flop (180) is connected to the I flip-flop and is configured to generate a K signal. An AND gate (182) gates the K and B signals to generate a Modify signal (184).

FIG. 10 depicts the Punctual (172) and the Modify (184) signals of the Modify generator (150) of FIG. 9.

It is important to underscore that the weighted tracking or weighted estimation includes a "multiply" operation on signals, wherein the modified tracking or modified estimation includes an "addition" operation on signals. Therefore, the weighted correlation tracking and the modified correlation tracking, as well as the weighted estimation and the modified estimation are substantially different modes of the carrier tracking or estimation operation.

Partial tracking circuits (12) and (14) of FIG. 1 can be independent from each other. The additional circuits (16) and (18) of FIG. 1 are also independent from the partial tracking circuits. It follows, that all combinations of weighted or modified tracking or additional circuits can be used in the apparatus (10) of FIG. 1 of the present invention. The Weight or Modify signal can be applied at each of the five processing levels (see discussion below).

FIG. 11 depicts the basic elements (200) of any partial carrier tracking satellite circuit (I channel (12) circuit or Q channel (14) circuit of FIG. 1), or the basic elements of any additional circuit used for estimation purposes (for instance, the channel estimation circuit (16) of FIG. 1). Each of those circuits includes the following basic elements: the input circuit (not shown); the local carrier generator (212); the complex mixer (210); the local reference code generator (218); the code correlator (216); the Accumulate and Dump circuit (222); and the computer (226). The functioning of each element of the standard satellite carrier tracking channel is well known to the person of ordinary skill in the art.

In the first Weight Input signal embodiment of the present invention, the inphase and quadrature components (I & Q) of the input signal (244) are weighted in the block (246) as shown in FIG. 12. The I and Q components of the weighted input signal (248) are further mixed with the I and Q components of the local carrier signal (252) in the complex mixer (250) which results in the I or Q component of the downconverted baseband signal (254). The local code reference signal (258) is correlated with the downconverted baseband signal (254) in the code correlator (256). The correlation resulting signal (260) is accumulated in the Accumulate and Dump circuit (262) and the resulting signal (264) is fed into the computer (268). The partial carrier tracking circuit or an additional estimation circuit can include the circuit of FIG. 12.

The computer (268) is used to close the carrier and code loops and to optimize the additional signals in order to estimate and minimize the contribution of the multipath carrier signal into the received satellite composite signal.

The Weight signal (242) is introduced in this embodiment at the input level. The Weight signal (242) can be implemented using a Weight Generator circuit of FIG. 7 as discussed above in detail.

FIG. 11 shows the modified input signal embodiment (200). This embodiment includes the same elements as the apparatus of FIG. 12, but the Weight input is replaced by Modify input (206).

In the first modified embodiment, the inphase and quadrature components (I & Q) of the input signal (204) are modified in the Modify Input block (206) as shown in FIG. 11. The I and Q components of the modified input signal (208) are further mixed with the I and Q components of the local carrier signal (212) in the complex mixer (210) which results in the I or Q component of the downconverted baseband signal (214). The local code reference signal (218) is correlated with the downconverted baseband signal (214) in the code correlator (216). The correlation resulting signal is accumulated in the Accumulate and Dump circuit (222) and the resulting signal (224) is fed into the computer (226).

The Modify signal (202) is also introduced in this embodiment at the input level. The Modify signal can be implemented using the Generator of Modify signals of FIG. 9 as was discussed above.

In one embodiment, the local reference code signals (218) or local carrier reference signals (212) can be delayed or advanced to account for processing delays in the Weight or Modify input circuits.

In another embodiment, the Weight or Modify signals can be delayed or advanced to account for processing delays or advances.

In the second weighted embodiment (350), as depicted in FIG. 14, at least one partial tracking satellite channel circuit or an additional circuit is weighted at the locally generated carrier level (356).

In this embodiment, the additional Weight signal (352) is introduced at the locally generated carrier level.

The further processing of the resulting signal (358) is the same as in the first Weight embodiment depicted in FIG. 12 and disclosed above.

The reference code signal (368) or Weight signals (352) may need to be delayed or advanced (see discussion above) to account for processing delays in the Weight circuit (356).

In this embodiment, the computer (378) is also used to close the carrier and code loops and to optimize the additional estimation signals in order to minimize the contribution of the carrier multipath signal into the received satellite composite signal.

Similarly, in the second modified embodiment (300) as shown in FIG. 13, at least one partial carrier tracking satellite channel circuit or an additional circuit is modified at the locally generated carrier level (306).

In this embodiment, the additional Modify signals (302) are also introduced at the locally generated carrier level.

The further processing of the resulting signal (308) is the same as in the weighted local carrier reference signal embodiment of FIG. 14.

In the third weighted embodiment (450) of the present invention, the carrier mixed signal is weighted in the Weight Carrier Mixed signal block (462) as shown in FIG. 16. The additional Weight signals (460) are introduced at the Weight carrier mixed signal level and are used to estimate and optimize the carrier multipath error signal. The further processing of signals in this embodiment is the same as disclosed above in relation to the second weighted embodiments of the present invention.

In one embodiment of the present invention, the Weight Carrier Mixed Circuit includes only the Q channel output (464). In another embodiment, the Weight Carrier Mixed Circuit includes both the I and the Q channel output (464).

In the third modified embodiment (400) of the present invention as depicted in FIG. 15, the carrier mixed signal is modified in the Modify Carrier Mixed signal block (410). The additional Modify signals (411) are again introduced at the Modify carrier mixed signal level and are used to estimate and minimize the carrier multipath error signal. The further processing of signals in this embodiment is the same as disclosed above in relation to the second modified embodiments of the present invention.

The fourth weighted embodiment (550) of the present invention relates to weighting of signals at the local reference code level as depicted in FIG. 18. In this embodiment, additional Weight signals (572) are introduced at the local code level in the block Weight Local Code (574). The further processing of signals in this embodiment is similar to the third weighted embodiment of the present invention disclosed above.

In the fourth modified embodiment (500) of the present invention shown in FIG. 17, the additional Modify signals (508) are introduced at the Modify Local Code level in the block (512). The further processing of the signal is disclosed above.

The fifth weighted embodiment (650) of the present invention shown in FIG. 20 utilizes the additional Weight signals (672) at the Weight Correlated Signal level in the block (668). The further processing is the same.

Finally, in the fifth modified embodiment (600) of the present invention as depicted in FIG. 19, the additional Modify signals (620) are introduced at the Modify Correlated Signal level in the block (616).

The present invention also discloses the method for decoding a composite signal including a transmitter signal and a multipath distortion component.

In one embodiment, the method comprises the steps of: (1) tracking the satellite signal by a tracking circuit, wherein the received signal includes the carrier multipath error signal; (2) generating at least one additional signal by an additional circuit, wherein at least one additional signal is used to estimate the carrier multipath signal; and (3) minimizing the carrier multipath error signal by using at least one additional signal by a computer.

In one embodiment, the step of tracking the satellite signal by a tracking circuit further comprises the step of generating a carrier weighted tracking function having a reduced multipath error response envelope.

In another embodiment, the step of tracking the satellite signal by a tracking circuit further comprises the step of generating a carrier modified tracking function having a reduced multipath error response envelope.

Yet, in one more embodiment, the step of generating at least one additional signal by the additional circuit further comprises the step of generating an additional carrier weighted function, wherein the additional carrier weighted function is used to estimate and reduce the carrier multipath error signal.

In an additional embodiment, the step of generating at least one additional signal by the additional circuit further comprises the step of generating an additional carrier modified function, wherein the additional carrier modified function is used to estimate and reduce the carrier multipath error signal.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for use in decoding a composite signal comprising:
   a satellite tracking circuit configured to receive a composite signal, wherein said composite signal includes a direct signal transmitted from at least one satellite and a carrier multipath distortion component, said satellite tracking circuit further comprising:
      at least two satellite partial tracking circuits: wherein said at least one partial tracking circuit further comprises:
         a Weight tracking circuit configured to provide said satellite carrier tracking function having said carrier multipath error response envelope; and
      at least one additional circuit connected to said satellite tracking circuit;
   wherein each said additional circuit is configured to generate an additional signal;
   and wherein each said additional circuit is configured to estimate and minimize said carrier multipath error response envelope of said satellite carrier tracking function.

2. The apparatus of claim 1; wherein said Weight tracking circuit further comprises:
   an (I & Q) Input Weight tracking circuit configured to process said input composite signal from said satellite and to generate an (I & Q) weighted component of said (I & Q) input composite signal.

3. The apparatus of claim 1; wherein said Weight tracking circuit further comprises:
   an (I & Q) Weight Local Carrier reference circuit configured to generate an (I & Q) weighted component of an (I & Q) local carrier reference signal.

4. The apparatus of claim 1; wherein said Weight tracking circuit further comprises:
   a Quadrature Channel Weight Complex Mixer circuit configured to generate a (Q) weighted component of a baseband sampled composite signal.

5. The apparatus of claim 1; wherein said Weight tracking satellite channel circuit further comprises:
   a Weight Local Code reference circuit configured to locally generate a Local code weighted reference signal.

6. The apparatus of claim 1; wherein said Weight tracking satellite channel circuit further comprises:
   a Weight Code Correlation circuit configured to generate a weighted correlation component of a composite correlation signal.

7. An apparatus for use in decoding a composite signal comprising:
   a satellite tracking circuit configured to receive a composite signal, wherein said composite signal includes a direct signal transmitted from at least one satellite and a carrier multipath distortion component, said satellite tracking circuit further comprising:
      at least two satellite partial tracking circuits; wherein at least one said partial tracking circuit further comprises:
         a Modify tracking circuit configured to provide a satellite carrier tracking function having a carrier multipath error response envelope; and
      at least one additional circuit connected to said satellite tracking circuit;
   wherein each said additional circuit is configured to generate an additional signal;
   and wherein each said additional circuit is configured to estimate and minimize said carrier multipath error response envelope of said satellite carrier tracking function.

8. The apparatus of claim 7; wherein said Modify tracking circuit further comprises:
   an (I & Q) Input Modify tracking circuit configured to process said input composite signal from said satellite and to generate an (I & Q) modified component of said (I & Q) input composite signal.

9. The apparatus of claim 7; wherein said Modify tracking circuit further comprises:
   an (I & Q) Modify Local Carrier reference circuit configured to generate an (I & Q) modified component of an (I & Q) local carrier reference signal.

10. The apparatus of claim 7; wherein said Modify tracking circuit further comprises:
    a Quadrature Channel Modify Complex Mixer circuit configured to generate a (Q) modified component of a baseband sampled composite signal.

11. The apparatus of claim 7; wherein said Modify tracking satellite channel circuit further comprises:

a Modify Local Code reference circuit configured to locally generate a Local code modified reference signal.

12. The apparatus of claim 7; wherein said Modify tracking satellite channel circuit further comprises:

a Modify Code Correlation circuit configured to generate a modified correlation component of a composite correlation signal.

13. An apparatus for use in decoding a composite signal, wherein said composite signal includes a direct signal transmitted from said at least one satellite and a carrier multipath distortion component; said apparatus comprising:

a satellite tracking circuit configured to receive said composite signal; wherein said satellite channel tracking circuit generates a satellite carrier tracking function having a carrier multipath error response envelope; said satellite tracking circuit further comprising:

at least two satellite partial tracking circuits; and at least one additional circuit connected to said satellite tracking circuit; wherein said at least one additional circuit further comprises:

a Weight estimation circuit configured to estimate and minimize said carrier multipath error response envelope of said carrier tracking function.

14. The apparatus of claim 13; wherein said Weight estimation circuit configured to estimate and minimize said carrier multipath error response envelope of said carrier tracking function further comprises:

an (I & Q) Input Weight circuit configured to process said input composite signal from said satellite and to generate an additional (I & Q) weighted component of said (I & Q) input composite signal.

15. The apparatus of claim 13; wherein said Weight estimation circuit configured to estimate and minimize said carrier multipath error response envelope of said carrier tracking function further comprises:

an (I & Q) Weight Local Carrier reference circuit configured to generate an additional (I & Q) weighted component of an (I & Q) local carrier reference signal.

16. The apparatus of claim 13; wherein said Weight estimation circuit configured to estimate and minimize said carrier multipath error response envelope of said carrier tracking function further comprises:

a Quadrature Channel Weight Complex Mixer circuit configured to generate an additional (Q) weighted component of a baseband sampled composite signal.

17. The apparatus of claim 13; wherein said Weight estimation circuit configured to estimate and minimize said carrier multipath error response envelope of said carrier tracking function further comprises:

a Weight Local Code reference circuit configured to locally generate an additional Local code weighted reference signal.

18. The apparatus of claim 13; wherein said Weight estimation circuit configured to estimate and minimize said carrier multipath error response envelope of said carrier tracking function further comprises:

a Weight Local Code Correlation circuit configured to generate an additional weighted component of a composite correlation signal.

19. The apparatus of claim 13; wherein said Weight estimation circuit configured to estimate and minimize said carrier multipath error response envelope of said carrier tracking function further comprises:

a Code NCO & Generator configured to generate a local code signal;

an A flip-flop connected to a local code output of said Code NCO & Generator, wherein said A flip-flop is configured to generate an Early signal;

a B flip-flop connected to said A flip-flop, wherein said B flip-flop is configured to generate a Punctual signal;

a C flip-flop connected to said B flip-flop, wherein said C flip-flop is configured to generate a Late signal;

a D flip-flop connected to a bit transition point output of said Code NCO & Generator; and an E flip-flop connected to said D flip-flop, wherein said E flip-flop is configured to generate a Weight signal.

20. An apparatus for use in decoding a composite signal, wherein said composite signal includes a direct signal transmitted from said at least one satellite and a carrier multipath distortion component; said apparatus comprising:

a satellite tracking circuit configured to receive said composite signal; wherein said satellite channel tracking circuit generates a satellite carrier tracking function having a carrier multipath error response envelope; said satellite tracking circuit further comprising:

at least two satellite partial tracking circuits; and at least one additional circuit connected to said satellite tracking circuit; wherein said at least one additional circuit further includes:

a Modify estimation circuit configured to estimate and minimize said carrier multipath error response envelope of said carrier tracking function.

21. The apparatus of claim 20; wherein said Modify estimation circuit configured to estimate and minimize said carrier multipath error response envelope of said carrier tracking function further comprises:

an (I & Q) Input Modify circuit configured to process said input composite signal from said satellite and to generate an additional (I & Q) modified component of said (I & Q) input composite signal.

22. The apparatus of claim 20; wherein said Modify estimation circuit configured to estimate and minimize said carrier multipath error response envelope of said carrier tracking function further comprises:

an (I & Q) Modify Local Carrier reference circuit configured to generate an additional (I & Q) modified component of an (I & Q) local carrier reference signal.

23. The apparatus of claim 20; wherein said Modify estimation circuit configured to estimate and minimize said carrier multipath error response envelope of said carrier tracking function further comprises:

a Quadrature Channel Modify Complex Mixer circuit configured to generate an additional (Q) modified component of a baseband sampled composite signal.

24. The apparatus of claim 20; wherein said Modify estimation circuit configured to estimate and minimize said carrier multipath error response envelope of said carrier tracking function further comprises:

a Modify Local Code reference circuit configured to locally generate an additional Local code modified reference signal.

25. The apparatus of claim 20; wherein said Modify estimation circuit configured to estimate and minimize said carrier multipath error response envelope of said carrier tracking function further comprises:

a Modify Local Code Correlation circuit configured to generate an additional modified component of a composite correlation signal.

* * * * *